(12) United States Patent
McCord et al.

(10) Patent No.: US 7,792,773 B2
(45) Date of Patent: Sep. 7, 2010

(54) METHOD AND SYSTEM FOR ENABLING AUTOMATED AND REAL-TIME DISCOVERY OF SKILLS AVAILABLE TO AGENTS AND SYSTEMS IN A MULTIMEDIA COMMUNICATIONS NETWORK

(75) Inventors: Alan Wayne McCord, Walnut Creek, CA (US); Colin Michael Leonard, Raleigh, NC (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 484 days.

(21) Appl. No.: 10/455,971

(22) Filed: Jun. 5, 2003

(65) Prior Publication Data

US 2004/0083195 A1    Apr. 29, 2004

Related U.S. Application Data

(63) Continuation-in-part of application No. 10/441,865, filed on May 15, 2003, now Pat. No. 7,373,410, which is a continuation-in-part of application No. 10/289,581, filed on Nov. 6, 2002, which is a continuation-in-part of application No. 10/279,435, filed on Oct. 23, 2002.

(51) Int. Cl.
*G06F 17/00* (2006.01)
*G06N 5/02* (2006.01)

(52) U.S. Cl. ........................................ 706/47

(58) Field of Classification Search .................... 706/1, 706/15, 45, 47, 18, 17, 36, 50; 700/1, 90; 709/231, 223; 707/3; 382/306; 370/401, 370/225; 705/1; 379/207.12, 207.14
See application file for complete search history.

(56) References Cited

U.S. PATENT DOCUMENTS 5,787,160 A   *   7/1998   Chaney et al. ......... 379/112.06

(Continued)

FOREIGN PATENT DOCUMENTS

JP              11-346266 A        12/1999

(Continued)

OTHER PUBLICATIONS

'IP Routers: New tool for gigabit networking': Metz, Dec. 1998, IEEE, http://computer.org/internet/, p. 14-18.*

(Continued)

*Primary Examiner*—Donald Sparks
*Assistant Examiner*—Peter Coughlan
(74) *Attorney, Agent, or Firm*—Central Coast Patent Agency, Inc.

(57) ABSTRACT

A system for routing an interaction request based on skill presence reporting has a routing application for determining best routing for the interaction request, a data store for storing and reporting skills data, and an object-oriented interface for presenting skills views including state information of those skills. The system is characterized in that it determines any skills requirements of the interaction request to be routed and discovers which skills of considered routing destinations are available at the time of routing, and routes the interaction according to the available skills discovered and matching the skills requirement, the available skills intrinsic to one or more than one routing destination selected to process the interaction.

6 Claims, 14 Drawing Sheets

Skills Discovery Routing and Reporting

U.S. PATENT DOCUMENTS

| | | | |
|---|---|---|---|
| 5,873,076 A * | 2/1999 | Barr et al. | 707/3 |
| 6,064,730 A | 5/2000 | Ginsberg et al. | |
| 6,332,154 B2 | 12/2001 | Beck et al. | |
| 6,332,163 B1 * | 12/2001 | Bowman-Amuah | 709/231 |
| 6,453,038 B1 | 9/2002 | McFarlane et al. | |
| 7,373,410 B2 * | 5/2008 | Monza et al. | 709/229 |
| 2001/0025309 A1 * | 9/2001 | Beck et al. | 709/223 |
| 2001/0029519 A1 * | 10/2001 | Hallinan et al. | 709/104 |
| 2002/0105957 A1 * | 8/2002 | Bondarenko et al. | 370/401 |
| 2002/0150311 A1 * | 10/2002 | Lynn | 382/306 |
| 2003/0099343 A1 | 5/2003 | Dezonno | |
| 2004/0083281 A1 * | 4/2004 | Makagon et al. | 709/223 |
| 2004/0083482 A1 * | 4/2004 | Makagon et al. | 719/316 |

FOREIGN PATENT DOCUMENTS

JP     2001-292236 A     10/2001

OTHER PUBLICATIONS

'Detecting disruptive routers: A distributed network monitioring approach': Bradley, IEEE, 0890-8044/98, p. 50-60.*

U.S. Appl. No. 10/441,865, Joseph Monza et al.

U.S. Appl. No. 10/289,581, Petr Makagon et al.

U.S. Appl. No. 10/279,435, Petr Makagon et al.

* cited by examiner

Skills Discovery Routing and Reporting

METHOD AND SYSTEM FOR ENABLING AUTOMATED AND REAL-TIME DISCOVERY OF SKILLS AVAILABLE TO AGENTS AND SYSTEMS IN A MULTIMEDIA COMMUNICATIONS NETWORK

CROSS-REFERENCE TO RELATED DOCUMENTS

The present invention is a continuation in part (CIP) of a U.S. patent application Ser. No. 10/441,865 filed on May 15, 2003 now U.S. Pat. No. 7,373,410, entitled Method and System for Providing Adaptive and Proactive Interaction Management for Multiple types of Business Interactions Occurring in a Multimedia Communications Environment, which is a CIP of a U.S. patent application Ser. No. 10/289,581 filed on Nov. 6, 2002 entitled "Method and Apparatus for Providing Real-Time Communication Center Reporting Data to Third-Party Applications over a Data Network", which is a CIP of a U.S. patent application Ser. No. 10/279,435, filed on Oct. 23, 2002, entitled "Method and Apparatus for Extending Contact Center Configuration Data for Access by Third-Party Applications over a Data Network" Priority is claimed to all applications mentioned above and the disclosure of all applications mentioned above are incorporated herein by reference. The present invention is also related to a U.S. Pat. No. 6,332,154 filed as Ser. No. 09/253,554 on Feb. 19, 1999 issued on Dec. 18, 2001 entitled "Method and Apparatus for Providing Media-Independent Self-Help Modules Within a Multimedia Communication-Center Customer Interface", disclosure thereof included herein by reference.

FIELD OF THE INVENTION

The present invention is in the field of telecommunication encompassing all existing sorts of interaction multimedia technology, and pertains more particularly to methods and a system enabling automated discovery in real-time of skills available to agents in a multi-media communications network.

BACKGROUND OF THE INVENTION

Some rather recent and major developments in communications technology extend far beyond the traditional and long-lived environment of computer-integrated telephony (CTI) as adapted chiefly for connection-oriented-switched-telephony (COST) interaction and routing. Today, communications and interactions can be presented in media formats supported by various software platforms and applications, including CTI applications and platforms, and can source from virtually any communications main or sub-network including the PSTN, the Internet, and all sorts of and combinations of connected sub-nets, both wireless and wired.

A system for providing communication-center statistical, configuration, and other important business related data to third party applications over a data network is known to the inventor and is described in disclosures referring to U.S. patent application Ser. Nos. 10/289,581 and 10/279,435 listed in the cross-reference section of this specification.

The system has an object-oriented interfacing component that is an intermediate service point connected to the network between the communication-center environment and third-party applications. The system also has a set of application program interfaces for transforming and transmitting communication-center statistical and configuration data from the hosting center to the intermediate service point and a set of application program interfaces for transmitting the communication-center statistical and configuration data from the intermediary service point to the remote third-party applications.

In a preferred embodiment the third-party application accesses the intermediate service point using the network and manipulates one or more Web-services hosted within the service point to configure to receive by subscription statistical, configuration and other data about specific communication-center entities described as objects including real time performance statistics and state information of those entities. In practice of the system, Java-based data is sent to the service point from the center and used for instantiating at least one object oriented data model, the model described as an XML document, which is rendered accessible in whole or part to a requesting third-party application or applications according to protocol used by the third-party application or applications.

U.S. Pat. No. 6,332,154 references and/or includes several other patent disclosures, the aggregate of which teach an object-oriented multimedia-based operating system termed a customer-interaction-networked-operating-system (CINOS) used in a multimedia communications center for managing all sorts of supported multimedia interactions both in and out bound. Using multimedia technologies and software, object-oriented framework, and both multimedia and text-based data storage facilities, which are cross-reference able, the system enables seamless and ongoing interactions to be managed. The interactions themselves can employ various multimedia types, and the system further enables interaction tracking, monitoring, recovery and utilization of records and associated data to further refine system capabilities in routing and other management tasks. Custom multimedia interfaces, multi-media dialog threading engines and interfaces, object-oriented GUIs and queuing systems, and a host of other technologically advanced components operate together according to enterprise rules to enable the system.

Among other capabilities of the system are capabilities for automated triggering of routing determinations where preferred media is selected for resulting interactions. In preferred embodiments interactions are recorded according to occurrence and are serially linked and can be referenced from a historical standpoint. The interactions conducted within the system environment proceed according to vertical business processes and rules and may include links to other recorded interactions involving one or more of the parties of the business process of an instant interaction. The linked historical interaction records can be of the same or of other media types related to or not related to the current interaction.

Enterprise systems in general often include several diverse and separate systems that are pulled together using a multimedia-center platform as a base platform. These systems offer some integration in the area of productivity and are often referred to as enterprise integrated architectures (EAIs). One of the key strengths of any customer interaction system is interaction management, which is a field the inventors have been active in for many years.

Traditionally, interaction management within a communication center refers to recording and/or monitoring a live interaction ongoing between a customer and a center operative, typically a center agent. In the more advanced systems known to the inventor and referenced in the cross-reference section of this specification, interactions of any supported media can be monitored and recorded in such a way that the business flow for one or a series of transactions including all of the individual interactions are captured and are recoverable. In this system authorized individuals can call up specific portions or entire chains of transactions or interactions by searching multimedia and text-based threads to produce a customized object-oriented view of information they are looking for.

As a further example, consider that agent Joe needs to review a historical record of a series of interactions relating to the purchase of a computer by a customer Tim. By entering the criteria of the customer name, purchase order and product number, all of the interactions that Tim conducted with the center that were related to the particular piece of business including the final transaction and any post-purchase interactions that occurred before the time that Joe initiated the search are recovered and presented to Joe as a graphics tree or object-oriented thread detailing the chain, with links to the actual stored media and complete text of the interactions. The fact that the chain represents multiple media types results from the unique ability of the customer interface of the system to enable the customer to select preferred media types for interaction. Therefore, the capability for pre-selecting a specific mode or modality for an interaction is already known to the inventor from the point of view of the client.

A limitation of the above-described system is that the customer must manually pre-set media preferences from offered media types at the time of interaction. If a customer prefers to interact in a preferred media type or types then he or she may set the interface to always respond in the given media types. The system may, in some cases automatically respond with a correct media type if a customer has already initiated an interaction with a specific media type and has no preferences set for a preferred media. The system described above is client interface intensive and could be further streamlined through enhancements in object orientation.

It has occurred to the inventor that an object-oriented system charged with managing customer interactions can be enhanced with new functionality that is not available in systems such as the systems described above. It has also occurred to the inventors that the definition of customer interactions should no longer be limited to single media sessions between two or more parties, but should be broadened to include multi-media sessions between two or more parties, the sessions happening concurrently between the parties.

It will be appreciated by one with skill in the art of interaction management that customer/center interactions are not the only type of interactions that occur within a communications center environment. Other types of interactions and interaction chains include those between business suppliers and business customers (B-2-B), those between third party applications and communication center applications (B-2-B), internal interactions between live personnel, and internal machine-to-machine interactions, internal machine-to-agent and agent-to-machine interactions, and other possible interaction mappings some of which may involve external sources. Furthermore, there are multiparty interactions such as chat, conferencing (video, audio), co-browsing applications, and the like.

It is desired that all possible interaction scenarios are recordable and recoverable and that the course of some interactions or interaction chains be automatically influenced by the occurrence of events that may relate to the business of the interaction or chain of interactions that are occurring or that will occur. Moreover, limiting media-type preferences to a client, in some cases, is not preferable to a communications environment host. For example, if a large number of clients of a communications center select all future interactions in the form of videophone for no specific reason, the costs of doing business could rise dramatically for the host. Although the above-referenced system provides the center with a capability to offer only media-types that it wants a client to use, a more dynamic solution is desired that provides some flexibility according to a rapidly changing business environment.

It is also desired that business transactions and various automated business processes, which may include many related interactions are recordable as a chain of interactions or "business chain" can be quickly modified in terms of business process should some related event necessitate a redirection or modification of business elements.

The inventor knows of an object-oriented system for managing interactions of multimedia types in a communication-center environment. The system has a virtual multimedia queue, a processor for processing events in the queue, an interaction server for selecting media type or types for events, a resource manager for reporting availability of a resource access point, and a data store for storing client information about media types available to the client and historical information about success of past use of those media types. In a preferred application, the system processes and routes incoming events of known media type to access points defined as systems or agents based in part on media channel availability of the access point, and wherein the system selects a media channel or channels for certain events in queue that are not pre-dedicated as specific media type events but are generated outbound or internal proactive contact events.

Proactive contacts are automatically generated and triggered according to business rules, which may include intelligent determination of a best media type or types to use according to history-based statistics regarding success and failure information of such contacts. Such proactive contact events, in some cases, can be triggered according to occurrence of a related event detected by the system, including system intercept or knowledge of a pending event.

Another major issue in interaction management is the capability of insuring that agents and knowledge workers having the appropriate skills are selected for interaction with clients of an enterprise. Traditionally, skills data about center agents are manually collected and maintained in a skills database for access by routing software. Creating a skills database that reflects agent skills accurately and persistently in a communications center is somewhat difficult. This is partly due to agent turnover within the center, agent skills improvements from previous skill levels, and so on. Likewise in a rapidly evolving environment that supports multimedia interaction where there is much more demand for various skills, some skills can quickly become obsolete as newer skills in newer applications, media types and technologies become "in demand" for replacement of the older skills. Compiling and maintaining an enterprise-wide skills database manually is a daunting task. However, this is the only proven way in prior-art enterprise contact center environments to accurately manage and utilize agent skill levels.

Manual compilation and updating of skill levels in different knowledge areas associated with an enterprise is costly and does not address skills that might avail themselves through agent knowledge of some resources that may be available externally from the enterprise domain. In fact many human skills that may be available are not discovered globally unless the owner of said skills reports the availability of those skills to an enterprise system. More particularly, those skills that are not reported are not discoverable and therefore are not predictable and cannot be tapped into by an enterprise system.

Therefore, what is clearly needed is a system and method for automated discovery and recording of enterprise personnel skills, including media-based skills and other skills availing themselves through agent-to-resource interactions that are not necessarily a part of routine enterprise business knowledge. Such a method and system would reduce enterprise costs by eliminating manual discovery, data entry, and updating routines associated with manual skill assessment and management and would improve routing intelligence by enabling use of most recent snapshots of improved skills including newly discovered and documented skills.

SUMMARY OF THE INVENTION

In a preferred embodiment of the present invention a system for routing an interaction request based on skill presence reporting is provided, comprising a routing application for determining best routing for the interaction request, a data store for storing and reporting skills data, and an object-oriented interface for presenting skills views including state information of those skills. The system is characterized in that the system determines any skills requirements of the interaction request to be routed and determines which skills of considered routing destinations are available at the time of routing, and routes the interaction according to the available skills matching the skills requirement, the available skills intrinsic to one or more than one routing destination selected to process the interaction.

In some preferred embodiments the skills views represent skills data and state information mapped to skills data in the data store. Also in some preferred embodiments state information of the skills represented in the skills views are dynamic and change according to use of skills by associated destination points. In some other embodiments the considered destination points are human agents, automated systems or a combination thereof.

In still other embodiments the skills views are processed by algorithm to produce scores used for isolation of a best skill set for processing the interaction according to the skills required by the interaction. In yet other embodiments at least some skills associated with destination points are identified as resources having contact information and connection path parameters available to one or more than one destination point, the resources not intrinsic to, directed by, or controlled by the enterprise hosting the routing system. In some cases the contact information and connection path parameters of each resource skill are organized in a dimensional overlay mapping each set of contact information and connection path parameters associated to one or more destination points having access to the resources.

In still other embodiments skill definitions include media types available to destination points and proficiency scores related to the use of each media type at the destination points. In still other embodiments skill definitions include application types available to each destination point including proficiency scores related to the use of those applications by the destination points. In still other embodiments skills proficiency scores are calculated by algorithm for each skill and wherein certain useable skills combinations are identified as skills and are similarly scored for proficiency, the skills combinations representing use of more than one skill simultaneously by a destination point.

In another aspect of the present invention a method for identifying and maintaining for future use, information related to skills that are non-intrinsic to an enterprise but are accessible through connection path to certain personnel of the enterprise is provided, comprising steps of (a) periodically discovering the existence of new skills and the skill contact and connection path data of those skills; (b) building a map holding at least a skill summary, host identification, contact data, and connection path information for each discovered skill; (c) rendering the map searchable through network connection; and (d) periodically updating the mapped information with new information as it is discovered.

In some preferred embodiments of the method, in step (a), the discovery of skills and associated data is made through periodic reporting by enterprise personnel to a central server location. In some other preferred embodiments, in step (a), the discovery of skills and associated data is made through subscription to periodic postings of the data posted by personnel as the skills become available. In still other embodiments discovery of skills and associated data is made through periodic analysis of interaction history data related to past interactions processed by the personnel.

In yet other embodiments of the method, in step (a), preferred media type for accessing a particular skill is included as part of the contact and connection path data associated with that skill. In yet other embodiments, in step (a), skills include access definition types for accessing human-served resources, system-served resources, and media-based resources. In still other embodiments, in step (b), the map is a data model representing modeled skills data and state information as currently stored in a data store. In still other embodiments, in step (b), the map contains logical connection path data representing human navigation steps or other human initiated functional steps that may be associated with a machine related connection path data defining the location of the resource and how to reach it.

In yet further embodiments of the method, in step (b), identification of preferred media type or types for accessing specific identified resources is included in the information used to build the map. In still other embodiments, in step (b), all of the map information is machine readable and human readable. In still other embodiments, in step (c), the map is accessible to a view service that also has access to standard skill and state information used in routing.

In yet other embodiments of the method, in step (c), the map is a resource for skills based routing. In yet further embodiments, in step (c), information taken from the map through network connection is rendered as object modeled data in one or more associated skills presence models owned by one or more, or a combination of routing destination points associated by identification to the mapped information.

In another aspect of the present invention a method for searching a network for and receiving data about personnel and systems including skills capabilities and skills rating information attributed to those personnel and systems is provided, comprising steps of (a) accessing an interface on the network from a network-capable device, the interface adapted to search skills data and generate object-oriented views representing retrieved data; (b) submitting a query identifying one or more desired skills to the interface; (c) searching matching skills data and related host identification data from data storage; (d) generating skills presence views for each of the identified hosts; (e) prioritizing the generated views according to a pre-set rule; and (f) returning the prioritized data in a fashion useable on the requesting device.

In some preferred embodiments of this method, in step (a), the network is a local area network having connection capability to the Internet network. In some other preferred embodiments, in step (a), the network-capable device is a mobile device. In yet other embodiments, in step (a), the network-capable device is hardwired to the network. In still other embodiments, in step (b), the query is one of an e-mail, an instant message, a structured query language message, or a Web form submission. In yet other embodiments, in step (b), the desired skills are skills required for a project either planned or envisioned. In further embodiments, in step (c), the skills data includes rating data related to skills proficiency.

In still further embodiments, in step (c), the skills data includes access definition types defining host access capabilities of human-served resources, system-served resources, and media-based resources. In yet further embodiments, in step (d), the skills presence views contain objects representing skills that are non-intrinsic to an enterprise but are accessible through connection path to certain personnel of the enterprise.

BRIEF DESCRIPTION OF THE DRAWING FIGURES

DESCRIPTION OF THE PREFERRED EMBODIMENTS

The inventors provide a system and method for dynamic management of interactions and interaction chains using proactive and adaptive methods. The method and system of the invention in preferred embodiments is described in enabling detail below.

Figure 1:
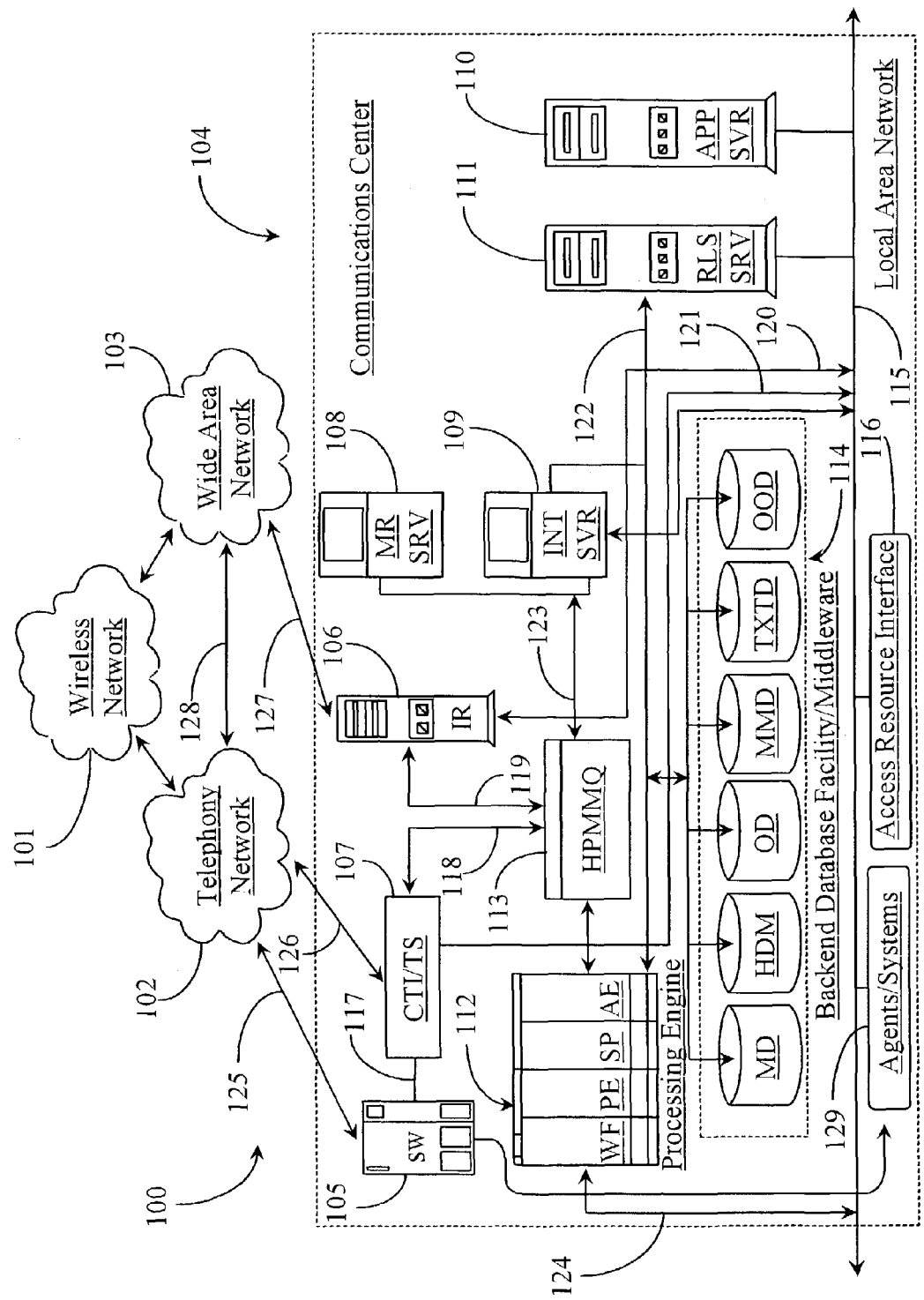
FIG. 1 is an architectural overview of an interaction management system according to an embodiment of the present invention.

FIG. 1 is an architectural overview of a communications network 100 enhanced with an interaction management system according to an embodiment of the present invention. Architecture 100 supports various communications networks including a wireless network 101, a telephony network 102, and a wide-area-network (WAN) 103. A multi-media communications center (MMCC) 104 is illustrated as a host of an enhanced object-oriented interaction management platform that is adapted to enable, among other tasks, dynamic management of interactions between entities of MMCC 104 and clients including business partners and suppliers.

Wireless network 101 may be a cellular digital network or satellite-enhanced network for enabling access to MMCC 104 for users operating a wide variety of wireless network-capable devices. It may be assumed that network 101 contains all of the equipment and components like wireless gateways, etc. that are required in order to practice wireless Internet and/or telephony access. Network 101 typically as one or more gateways (not shown) into telephony network 102 and one or more gateways into WAN network 103. In some embodiments, network 101 has a gateway directly bridging wireless users to MMCC 104 and networks in place therein. Bidirectional arrows logically illustrate bridging capability into both networks 102 and 103 herein.

Telephony network 102 may be a public-switched-telephony-network (PSTN), or any other type of private or public telephone network. Network 102 carries dedicated connection-oriented-switched-telephony (COST) events. Network 102 may be assumed to contain all of the required network equipment like service control points (SCPs), telephony switches, CTI-enhancement processors connected to switches, network carriers, gateways into other networks and any other required equipment for practicing state-of-art telephony.

WAN network 103 is, in a preferred embodiment, the well-known Internet network. In other embodiments, WAN 103 may be a corporate or private network including an Intranet, Ethernet, or a bridged network of several sub-nets. The inventor prefers that WAN 103 encompass the Internet network because of a high public-access characteristic and because of unlimited geographic boundaries. It may be assumed in this example that the enterprise hosting MMCC 104 also maintains network-based equipment within the domain of network 103 like one or more intermediate servers hosting Web-services analogous to those described with reference to Ser. Nos. 10,289,581 and 10/279,435 listed in the cross-reference section of this specification.

Telephony network 102 and WAN 103 are bridged together for cross communication as is logically illustrated by a bi-directional arrow 128. Bridging capabilities may be implemented by any of several known gateways and bridging facilities known in state-of-art network bridging equipment. One with skill in the art will appreciate that in actual practice networks 102 and 103 do not have clear physical separation from one another in terms of carrier lines and equipment boundaries. A user may communicate with a destination connected to any of the illustrated networks from any other network through state-of-art bridging facilities.

MMCC 104 is illustrated in this example as a dual-capable MMCC meaning that it may process COST events, data-network-telephony (DNT) events, which include a subset of DNT known generally as Internet Protocol Network Telephony (IPNT) events. DNT events also include those sourced from wireless network 101 through a wireless application protocol (WAP) gateway or other known gateways.

MMCC 104 has a central office (CO) telephony switch (SW) 105 provided therein and adapted to receive COST events directly from network 102 and to send COST events into network 102 from within. SW 105 may be an automatic call distributor (ACD), a private branch exchange (PBX) or other type of known telephony switching apparatus. One or more COST telephony trunks, logically illustrated herein as a bi-directional arrow 125, provide dedicated network connection between SW 105 and a similar switch or routing point maintained in network 102 and local to MMCC 104.

SW 105 is enhanced for routing intelligence by a Computer/Telephony Integration (CTI) processor 107 running at least an instance of routing software known to the inventor as Transaction Server software (TS). CTI processor 107 has connection to SW 105 through a CTI-link 117. Although it is not illustrated in this example, it may be assumed that in some embodiments a CTI processor similar to processor 107 is also provided within network 102 to enhance a local switch or service point having direct telephony connection to SW 105 by way of trunk(s) 125. In such an embodiment a separate digital link 126 is provided connecting processor 107 to the network processor so that routing intelligence and other MMCC functionality may be extended into network 102. Other intelligent peripherals (not shown) may be similarly provided at the level of network 102 such as interactive voice response (IVR) units and statistical-based server applications known to the inventor.

Using the above-described telephony network implementation, events arriving at SW 105 have already been interacted with in network 102 and caller information has been sent ahead to one or more destinations within MMCC 104 often ahead of arrival of the actual COST event.

MMCC 104 has an intelligent data router (IR) 106 provided therein and adapted to receive both synchronous and asynchronous events from network 103. IR 106 is adapted with all of the required network protocols to enable function as a continually active network node. IR 106 has connection one or more enterprise-hosted Web-servers or other client-access servers maintained within network 103 by way of a network communications line logically illustrated as line 127. DNT events that are synchronous events include any event that requires a response in real time communication. An asynchronous event includes any events that do not require an immediate real-time response in order to maintain the state of the event. E-mail, voicemail, Web-forms, Web-posts, and so on are asynchronous. Of course events may arrive at either SW 105 or IR 106 that are sourced from wireless network 101.

MMCC 104 has a plurality of agent stations and automated systems disposed therein and logically illustrated herein as agents/systems block 129. For a state-of-art communications center capable of multimedia event processing, a typical agent station includes a network-connected computer system with a graphic user interface (GUI), a COST telephone, and a host of communications applications executable on the computer system. In some cases various wireless peripherals like personal-digital-assistants (PDAs), Internet-capable telephones or headsets, pagers, cellular telephones, and the like compliment an agent's repertoire of communications devices that may be used in processing interactions. Executable applications running on an agent system may include e-mail, voice-mail, instant messaging, store and forward messaging services (SMS), voice conference applications, file share programs, Web-conference applications, electronic facsimile applications, and others.

Agents/systems 129 may be assumed to include many individual manned stations that may be grouped logically by product or business criteria or set-up as individual contact stations. There are many possibilities. Systems within agents/systems 129 may include automated systems that respond automatically to events without live intervention. Such systems include automated e-mail and facsimile systems, automated self-help applications, automated IVR functions, and so on. All agent workstations within block 129 are, in this example, connected to a local-area-network (LAN) 115. LAN 115 is adapted with all of the required network protocols, including transfer control protocol/Internet protocol (TCP/IP) to be enabled as an extension of or sub-net of network 103. In this example, LAN 115 enables agent stations for network communication including internal cross-communication using any of the available media types.

Agent stations 129 are connected to CO telephony switch 105 by internal telephony wiring to enable dedicated connections to agent COST telephones. Agent stations 129 are also connected through computer LAN connections to IR 106 via a network connection 120. Other agent communication devices such as IP telephones may also be LAN connected and may receive and send events through IR 106.

LAN 115 also supports an application server 110. Application server 110 hosts certain communications center applications shared by live agents. CTI processor 107 also has connection to LAN 115 by way of a connection 121. In this way information taken about callers and pending COST events may be routed to agent GUI interfaces before the actual COST calls are taken over telephones. LAN 115 may also support other servers and systems that are not illustrated in the example but are common in state-of-art centers like administration stations, knowledge bases, chat servers and so on.

The interaction management platform has a backend database facility and middleware component 114 that is adapted to where house data for MMCC 104. Data stored in facility 114 is map able through middle-ware (not shown) to a common communication center business model including a generic interaction model. An interaction model is provided for the purpose of enabling efficient interaction management tasks in both proactive and in adaptive real-time business scenarios. The model (not illustrated) represents all of the functionality and media management capabilities of MMCC 104.

Data stored in facility 114 is logically segregated into different data types. For example, a Meta data (MD) component is provided for storing Meta data about products, services, customers, and other descriptive data. A historical data mart (HDM) is provided within facility 114 and stores historical data related to customer contact histories including success and failure statistics related to previous contact attempts using specific media types. An operational data store (OD) is provided within facility 114 and adapted to store all MMCC operational related data and history. A multimedia database (MMD) is provided and adapted to store records of all multimedia events that have occurred. A text-based database (TXTD) is provided for storing interaction threads containing text-based interactions and text renderings of the multimedia records stored in the MMD. An object-oriented database (OOD) is provided within facility 114 and adapted to store all of the communication center and enterprise business model objects and object components used to create and render dynamic front-end views that may be manipulated to alter or to extend functionality.

One with skill in the art will appreciate that facility 114 may, in one embodiment by a single storage facility having partitions to represent the differing data types. In another embodiment separate storage mediums are provided to store each differing data type. In one embodiment, facility 114 may be a legacy system. Further, the term multimedia database should be understood broadly to mean a data store in a multimedia call center or enterprise, not just a database that stores multimedia events or transactions. So such a database may store at some times and under some circumstances, just one type of media or transaction.

A high-performance multimedia queue (HPMMQ) 113 is provided within MMCC 104 and is adapted in this example as a virtual queue capable of optimum high-speed performance. Queue 113 is enhanced from a traditional middle-ware data queue because of its performance criteria. It is noted herein that in a preferred embodiment Queue 113 is a virtual queue wherein processing of events takes place by manipulating information associated with a token representing a specific event including type of event.

Queue 113 is a multimedia queue in the sense that all events including COST events that are processed either by systems or live agents are queued therein. In one embodiment, queue 113 is partitioned according to type of event. For example, all e-mail and voice mail events pending routing occupy an assigned portion or partition of queue 113 while all video/voice calls occupy another portion and so on. In this example, queue 113 also contains a portion for system-to-system events. In a preferred embodiment queue 113 also separates inbound events from outbound events. The term virtual queue is a term that implies that all real events are only represented in queue 113. However, some real events like system requests, IMs, SMS messages, and so on may be queued therein and not simply represented by icon or token without departing from the spirit and scope of the present invention.

CTI processor 107 has a direct connection to queue 113 by way of a high-speed data link 118. IR 109 has a direct connection to queue 113 by way of a high-speed data link 119. When COST events arrive at CO switch 105 notifications of the waiting events are queued in queue 113 by processor 107 detecting the events. Some or all of DNT events and notifications are represented in queue 113. It is noted that as a router with connection to LAN 115, IR 106 may be adapted to directly route some events to agents or systems without queuing the events in queue 113. However, in practice of interaction management, all interaction capabilities of agent and systems are considered in terms of availability in real time for routing and in terms of triggering new interactions under proactive outbound and adaptive scenarios that may also be affected by enterprise rules. For this reason, it is preferred that all events of all media types are queued and managed in queue 113.

Queue 113 is a high performance queue in the sense that it is not a data queue (holding the actual event data) and in the sense that a powerful high-speed processor controls processing within queue 113. Queue 113 is processed using an optimized set of algorithms for skill-based routing and for load balancing scoring. Optimization enables the system of the invention to search and sort among a large volume of pending requests in queue 113 in a flexible and expedient manner. Optimization through algorithm also provides fast location of a best resource or interaction for each pending request.

A processing engine 112 is provided as part of the interaction management system of the invention and has direct connection to queue 113. Engine 112 is responsible for processing events in queue according to one or more of several criteria governed by real-time dynamics and enterprise rules. Engine 112 has direct access to all components within queue 113.

Engine 112 has a workforce management (WF) component that is dedicated to processing workforce assignments and distributing them to available agents of center 104. This function requires considerable processing power because it is affected by real-time dynamics and metrics. For example, as agents begin processing specific events of certain media types their real-time event processing loads will change. Such changes may trigger the WF component of processing engine 112 to assign an additional media type or types for the agent to continue with while relieving the agent of another type. In this example, WF component within engine 112 generates internal system-to-system events or system-to-agent events to implement WF management events. The events once generated are distributed to the appropriate agents and systems through IR 106 as internal communication or directly to agents and systems by way of a direct connection 124 between processing engine 112 and LAN 115.

Engine 112 has a direct network connection 122 to a rules server (RLS SRV) 111. Server 111 is adapted to store and serve enterprise rules among other things, rules regarding WF management. WF component in engine 112 also has direct access to all of the data stores represented in facility 114 through the appropriate middleware. VF management data may be stored in OD (operational data store) identified by agent and or system. One reason for storing WF management data is so that assignment data and subsequent load calculations can be computed into results that may be used statistically to refine WF management assignments. Of course the goal is to assign a manageable amount of work without overloading or under loading system queues in any media type.

Processing engine 112 processes on an abstract level meaning that it works to manipulate (in the case of WF) a work force management model that is a generic model except for processing manipulations. An object of the present invention is to provide model views that can be altered and modified to reflect specific states and state transitions in a real-time high-speed environment. A workforce assignment for a particular agent or a group of agents may also include automated system commands that enable triggering of specific applications from application server 110 and automated commands that enable or disable certain components at workstations and automated communications systems themselves. Therefore WF component in engine 112 can also provide assignments to automated systems with no live intervention.

Engine 112 also has a proactive engine (PE) component adapted to provide proactive outbound contact management for clients of MMCC 104. An interaction can be defined as a single real-time synchronous interaction using one media type or as a concurrent synchronous interaction using more than one media type. Moreover, a series of interactions that define an interaction chain can be thought of as a business process governed by rules. For example, there may be more than one synchronous interaction that is required to close a specific transaction. The initiation of the transaction and all of the actions that occurred before the close of the transaction can define a business process or "vertical application".

PE component within engine 112 uses knowledge of separate modeled "business processes" or "business chains" and contact history data to decide when in a business chain an appropriate outbound contact can be generated in synchronous or asynchronous media to help streamline the business chain by making it possible for the client to provide further input that may lead to a faster closing of a transaction, for example. To aid this function, HDM within facility 114 provides historical data about previous media specific outbound contact attempts and success or failure statistics of those events per customer or per a transaction that may involve more than one party (several customers). HDM also has client preference data describing preferred media types and other etiquette preferences for contact purposes. In a preferred embodiment client itineraries are also considered in processing. For example, a client may have initiated a transaction, but then left for a vacation. The client's vacation itinerary may include a preferred contact media type that may not be the normal preferred contact media of the client at work. The ability to select an optimum media type to use for a client contact to insure the best contact at any given time is termed adaptive interaction management by the inventors.

The core functionality is that the system can proactively trigger outbound interactions and/or notifications selecting specific synchronous or asynchronous media types and can adapt to events and changing scenarios wherein the proactive decision to trigger an interaction is made by the system and the specific media type or types for interacting are chosen by the system. Adaptive functions are functions that describe capabilities of the system to adapt to changing scenarios, detected events, and received or intercepted knowledge of events to provide intelligent contact determinations and "best media determination" for a contact.

Part of PE component within engine 112 is a self-learning component. The self-learning component enables proactive outbound contacts to be initiated using the most optimum media type and contact parameters to ensure the best chance for success of contact and probable response. For example, if a client like a business partner repeatedly does business with center 104 then all of his or her available media types, contact parameters, preferences, rules for etiquette, and normal itinerary, are stored in HDM within facility 114. Also stored in HDM under the same client ID parameters are statistical data regarding hit and miss rates of previous proactive outbound contacts and the result data of those contacts over an extended period of history. Over time, the system "learns" what the most successful proactive contact media types are and when the best times are to initiate the contacts. As more data is compiled more intelligence is gleaned.

A skills presence (SP) component is provided within engine 112 and adapted to optimize routing of interactions by injecting current skills presence data including available media "skills" into the routing process. While skill-based routing has been practiced and is known to the inventor, a novel component of SP within engine 112 is a component for learning not only basic agent skills, such as media type availability or skills such as bilingual capabilities, and knowledge of a product or service, but also for learning skills related to software application knowledge, proficiency in certain communications skills, multitasking capabilities in more than one media combination, and skills that may be acquired through external connections or sources maintained by a particular agent.

SP component within engine 112 calculates real-time skill levels of all available agents that could be a destination for any particular event in queue 113. After comparison the field is narrowed to one or two agents that posses the best skill rating for handling the specific event waiting. The system is self-learning in that as skill levels of agents increase in particular areas, or skills become obsolete due to applications switching (from old to new), the component avails itself of the latest data available in facility 114, perhaps in MD storage.

Agents initially report certain basic skill levels, and other skills are evaluated during periodic reviews. As an agent acquires higher skill levels and as new skills are acquired, the data is recorded and reused in skill-based routing. Skills can be discovered that are not traditional in the sense of skill-based routing but are derived from agent contacts and connections that can be external from the communications center such as access to knowledge bases, or access to additional service professionals known to the agent but not necessarily part of the communication center. One example might be that if an agent is particularly efficient using a search engine then he may receive "points" over another agent with mediocre search engine skills. The more experienced agent in data searching potentially can provide better information faster thus denoting a higher skill level.

Another unique component of processing engine 112 is an adaptive engine (AE). AE component within engine 112 is adapted to cooperate with the PE component to modify processes to react successfully to changes in business or workplace scenarios. For example, if a number of events within queue 112 are purchase requests for a specific product and the standard shipping time is included in a automated e-mail notification of "confirmed order" that goes out to all buyers, and a business event becomes known to the system that will affect the shipping time, then the AE component will cause the text of all of those automatically generated e-mails to be altered to reflect new estimated shipping periods for all current (in queue) and future buyers. Moreover, a proactive campaign using PE component is also undertaken to update clients who have already received e-mail confirmations with automatically triggered outbound contacts that provide the latest information. The outbound contacts do not necessarily have to be all e-mails. Depending on circumstances some of those contacts may be cell messages, automated IVR-based telephone calls, or notifications of other types of media.

An interaction server 109 is provided and adapted among other things to select and manage media types and knowledge resources reflecting past present and future availability states of those resources and knowledge pools. Knowledge of available media and resource types is obtained from a media resource server 108 connected server 109 by a high-speed data link. Interaction sever 109 has direct access to queue 113 and direct access to processor 112. Processor 112 processes from the queue using interaction server 109 as a resource. Interaction server 109 provides management presence information and state across the entire enterprise.

In this example, interaction server 109 is illustrated as logically separate from processing engine 112 and queue 113, however in actual practice the just-mentioned components may reside in one physical machine. Server 109 is responsible for resource discovery and for providing routing intelligence used by IR 106. Server 109 is responsible for serving the intelligence for connection the appropriate resources together at an appropriate time both in a real-time sense and in a future sense for time based interaction.

Server 109 hosts a resource collaboration service that is adapted to set up collaborative media session capabilities between more than one available resource including provision of the intelligence required for establishing the appropriate call and/or connection legs, which are, in a preferred embodiment modeled objects. Server 109 also maintains state of existing interactions taking place within the enterprise domain. Server 109 is also adapted to maintain active business and customer context during ongoing interactions recording and logging the information for history-based data storage.

Yet another service provided within server 109 is a service for setting up real-time conferencing sessions that focus on human collaboration required to resolve certain crisis issues and other important matters that must be resolved quickly. These sessions are set-up by server 109 in a proactive manner through outbound contact and invite mechanisms that may be of a variety of media types. These virtual sessions are maintained within the server in virtual meeting rooms termed enterprise-action-rooms (EARs) by the inventors. It is important to note herein that server 109 provides the intelligence for media resource availability, connection parameters for routing and setting up collaborative interactions, as well as other intelligence required for processing requests from queue 113. However server 109 is not limited to the only source of intelligence for enabling the B2 platform. It is noted herein that responsibility for provision of data, presence information, and for maintaining sates of interactions and recording interaction histories can be distributed among other functioning system components like processor 112 without departing from the present invention.

In one embodiment of the present invention HPMMQ 113 is adapted to queue "generic" outbound events wherein the best media type for the outbound event is automatically selected for the event after it is in queue. In this embodiment if a live agent has to contact a list of clients, for example, he or she can simply drag the list into a "queue representation" on his or her desktop application. This action causes all of the clients on the list to be queued as part of a real-time outbound contact campaign. Instead of the agent having to execute a particular media type or picking up a telephone handset, the events are assigned the best media types by server 109 for the context of the situation and client data stored in HDM within facility 114.

In one embodiment all of the outbound events queued in HPMMQ 113 will be assigned a synchronous media type because an immediate response is required by the context of the interaction. In another embodiment a mix of synchronous and asynchronous media is used because an immediate reply may not be required for a specified period of time and client media preferences may differ. The different media-based interactions, if synchronous will treated as incoming interactions on the agent side following all of the basic rules for incoming interactions. Of course, the events may be mixed in priority with other outbound campaigns that are running within the system. In this way both live interactions and system notifications can be made proactively without the agent having to select the media type.

Asynchronous media types that are part of the campaign can also "pop up" in order of queue state on the agent desktop for content filling and execution if they are not automatically generated messages. In another embodiment the agent may have a pre-set script that is used for all messages text or audio that are to be automatically generated.

In another embodiment of the present invention HPMMQ 113 can have incoming events sourced from a Web server maintained in WAN 103, which are generic incoming events or "a request for contact" of an unspecified media type. In this embodiment processing engine 112 and Interaction server 109 work together with facility 114 to come up with optimum media types for interaction based on client parameters and agent skills and availability. For example, if a client is interacting through a Web-services contact server maintained by the enterprise, the system can choose the best media type for the pending interaction after a queue position has been established.

In this aspect a selected media type automatically becomes an outbound contact and connection to a live agent or automated system depending on need. At the Web interface, the client may input the reason for contact along with the generic request submission. If, for example, the reason is "I want to purchase" then an outbound telephone call may be established to the client cell phone number and the event in queue will be connected to a live agent once the client answers. The transaction can then occur.

As was previously described above, an interaction in a more complex form may include more than one simultaneous media type that co-executes during the interaction. For example, if the previously mentioned client's event is a "I want to purchase" and "need technical assistance", then a telephone contact and connection may result with an additional whiteboard session simultaneously established through the client and agent interfaces. In this way the agent has more interaction tools to aid in closing a transaction. The scenario may be that the agent receives a telephone call as an inbound call with the client waiting and also receives an automatic "execution" of a conference application that calls the clients computer application to establish the whiteboard session during the telephone interaction. There are many possibilities. In this embodiment neither the client nor the agent has to manually start any communications programs in order to interact.

As previously described, the interaction possibilities are modeled after supported applications in the center and applications that are known to be available at the client's end. All interaction objects are stored in an object-oriented database (OOD) within facility 114. Similarly, communication-center call model objects, data reporting objects, system component objects, and other objects that make up the enterprise business model can be stored in OOD within facility 114. If the client is a business partner or supplier then typically they would have access to a set of groupware available that is duplicated on the system side. The groupware applications can be manipulated according to system directive based on client historical data and agent availability data (routing). The only human intervention is reduced to accepting the interaction and engaging in the business process. For business partners and suppliers who are largely mobile, secondary sets of communications applications are considered.

In an optional embodiment all interaction requests are interfaced through an access resource (AR) interface 116 connected to LAN 115. Resource interface 116, in this alternate embodiment, maintains of all of the current agent states like busy, ready, not ready and so on including system media states available for each agent and system logged into the enterprise grid and processing from queue 1113. Agent availability in this embodiment is determined in part by skill level assessment and in part by available media types. So if a client event in queue is determined to require a specific media type for a response or to complete a real-time request, then an agent having that type of media available and having appropriate skill level would be selected for routing. This embodiment reflects an example where some responsibilities of interaction server 109 may be distributed in this case to a resource interface.

Once an agent is interacting with a client using a specific media type, the agent may add media types to the interaction opening another media channel by drag and drop method on the agent desktop application which would include a client application or plug-in of platform software enabling interaction server 109. Additionally, an agent may request a transfer of the client to another agent using the same or another media type by submitting a transfer event request to access resource interface 116, which upon receipt will process the request according to next best match of an agent with the appropriate media type available. In one embodiment, the submitted transfer event is re-queued while the current interaction is ongoing. When the new agent is found by the system the ongoing event can be automatically terminated and re-established with the new agent. Moreover, conferencing with more than one agent may also be practiced. In these interactive scenarios, the B2 system, more particularly interaction server 109 is responsible for setting up call legs required to "open" and "connect" clients to agents or automated systems. Considered criterion for adapting to a specific media for an event can include but is not limited to:

day-of-week
    time-of-day
    vacation
    location
    device type device properties
device bandwidth
current customer activity
priority of required customer decision
customer profile attributes The core of the adaptive part of the media adaptive portion of the system of the present invention is a decision process and a historical database of previous delivery success/failure information. The decision process may consist of a "connectionist" decision making system such as an artificial or real neural network that uses the historical information to train itself to select the optimal channel to use to contact an individual in specific situations, times, urgencies and according to courtesy/etiquette rules. Alternatively, a simple decision process based on scores and weight factors of previous channel delivery success or failure rates could be used.

Figure 2:
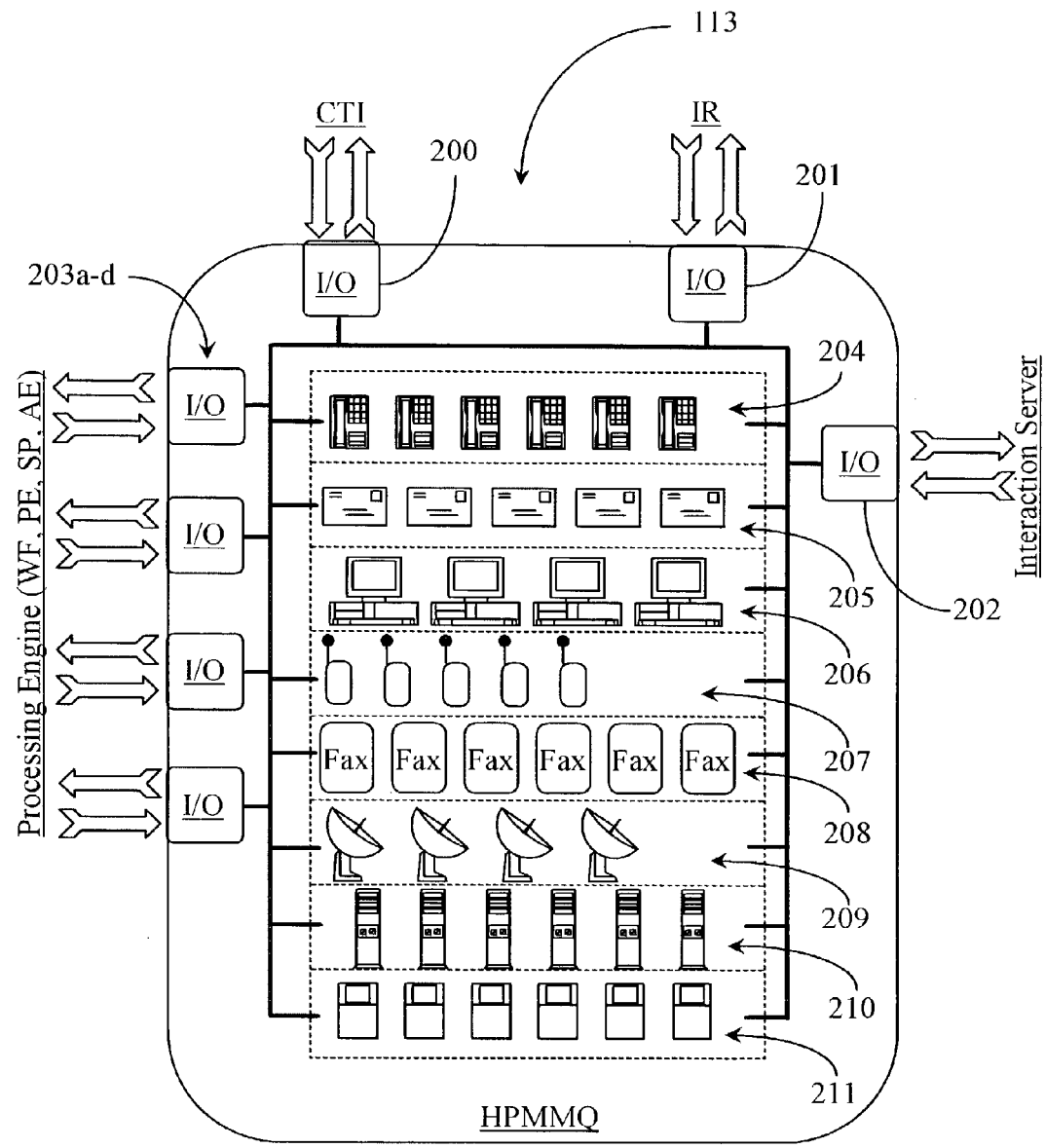
FIG. 2 is a block diagram illustrating a High Performance Multimedia Queue according to an embodiment of the invention.
Figure 2:
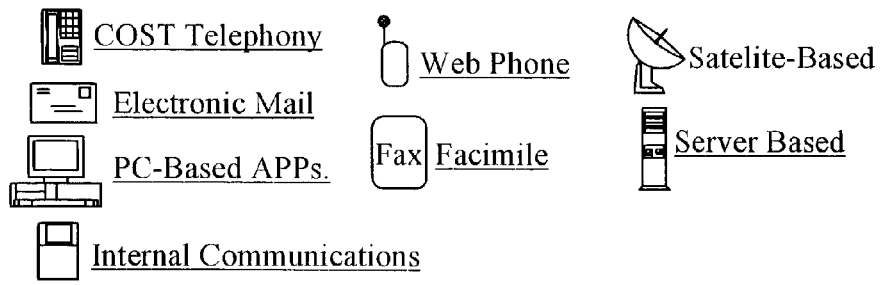

FIG. 2 is a block diagram illustrating High Performance Multimedia Queue 113 of FIG. 1 according to an embodiment of the invention. HPMMQ 113 is, in a preferred embodiment, a virtual queue with pending multi-media events represented as icons or tokens. In this embodiment queue 113 is organized logically according to events of a same media type. The preferred organization by media type is not a requirement for practice of the present invention however because other queue-organization criterion can be applied.

Queue 113 has an input/output I/O port 200 for CTI communication that applies to COST telephony events. I/O port 200 may be assumed to contain all of the required circuitry necessary for port communication and input/output of data. Queue 113 has an I/O port 201 adapted for communication with DNT routing systems like the IR system described with reference to FIG. 1 above. All DNT, including IPNT media events come in and out of queue 113 through port 201. One with skill in the art will appreciate that there may be more than one I/O port dedicated for COST telephony events as well as more than one port dedicated for DNT events without departing from the spirit and scope of the present invention. The inventor illustrates just one port each and deems the illustration sufficient for explanatory purpose.

Queue 113 has an I/O port 202 for enabling bi-directional communication with the interaction server described with reference to FIG. 1 above. Port 202 contains all of the required circuitry as was described with reference to ports 200 and 201. Queue 113 has I/O ports 203a-d for enabling bi-directional communication with processing engine 112 described with reference to FIG. 1 above. In this example there is one dedicated communication port for each component that provides processing services for events in queue.

Queue 113 has a portion 204 thereof dedicated for COST telephony events. Pending events for internal routing are illustrated as telephone icons as illustrated in a table located at the bottom of FIG. 2. In one embodiment all events in queue portion 204 may be incoming events. Another portion (not illustrated) may be provided and dedicated for outbound COST events. In another embodiment both incoming COST events and outbound COST events may occupy portion 204. As is typical, COST events are dedicated connections established by telephony switches therefore events represented in portion 204 of queue 113 are virtual.

Queue 113 has a portion 205 thereof dedicated to electronic mail events. Events of this type are asynchronous for the most part and include e-mails and voice mails represented herein with a mail icon. Similarly, portion 205 may also be used for other message carriers like IM. IM messaging can be considered a synchronous form of communication if practiced in real time as a continual communication flow consisting of a sequence of sent and received messages from the point of view of the client or of the center.

Queue 113 has a portion 206 dedicated for computer-based telephony and other computer installed communications programs excluding in this case e-mail. Computer icons represent events pending in portion 206. It will be appreciated that although the computer icons appear identical to one another, the actual media types of the pending events may vary somewhat. For example, one event may be an IP telephony request while another event may be a computer-based conference request using groupware.

Queue 113 has a portion 207 thereof dedicated to wireless telephony communication like cellular telephone or radio-telephone communication. An icon resembling a cellular telephone represents this type of event. Wireless device configurations may also include Laptop-based events, paging events, or events based-on other wireless devices or peripheral devices.

Queue 113 has a portion 208 thereof dedicated for facsimile transmission whether COST based or DNT based. In one embodiment, events that trigger an automated fax response are mixed in with those that request a human initiated fax in response.

Queue 113 has a portion 209 dedicated for satellite-based events like satellite telephone calls and other event types that can be initiated using satellite services. This embodiment assumes that the center itself hosts a wireless network for mobile knowledge workers, salesmen, or other authorized personnel. A satellite dish icon is used in this example to logically represent satellite-based communications.

Queue 113 has a portion 210 thereof dedicated for server-based interaction like chat interaction, Co-browsing sessions, Web conferencing, and the like. These types of events are typical of partner and supplier communications using a variety of automated and live services including the use of groupware for collaboration. A server icon is used in this example to represent server-based communication.

Queue 113 has a portion 211 thereof dedicated for internal system-to-system, agent-to-system, and agent-to-agent internal communication events that can take place using a variety of media. For example, internal COST calls between agents, internal machine requests and notifications, internal text messaging, etc. can qualify as internal communications. A simple messaging icon is used in this example to represent internal communications.

Queue 13 may be implemented according to any priority schemes that are designed by the enterprise hosting the system. In this embodiment all pending events in queue 113 are roughly identified according to media type from the viewpoint of an administrator looking at the available icons. However, exact media type of each event is distinguishable by attributes associated with each icon. The interaction model is generic until the exact media and event parameters and associated attributes are attached to it. In one embodiment all media types are established before event queuing takes place. For example, before a COST event appears in queue 113 the call parameters and media type of call is known.

However in another embodiment, the events in queue 113 are virtual events meaning that the event tokens in queue represent a pending communication event that will take place wherein no exact media type or complete connection parameters other than participant ID have yet been established. In this embodiment the parameters and connectionist decision including the media that will be used are all decided while the event waits in queue. During this process the event "takes shape" according to system processing in queue and only after the particular attributes are attached, becomes a virtual representation of an actual event pending execution. This embodiment is enabled in an outbound theme in a preferred embodiment wherein an agent can initiate an outbound interaction and have the preferred media type and channel decided for him. However in another embodiment, incoming events in queue may be virtual events if sourced from an enhanced Web-portal or other client interface. The event is enabled when routing and media channel determinations are made. The system then makes the appropriate connections.

Queue 113 is logically represented herein to contain a bus structure that reaches every queue level so that conceivably every I/O port has access to any queue partition. All of the interaction building blocks (objects) for single and complex interaction types are stored in ODD within facility 114 described with reference to FIG. 1 above. Vertical applications are represented as generic business models having a basic construction that represents a standard business process one or more transactions. Exact models will depend of course on the nature of business conducted by the enterprise. The applications take on specific attributes in real-time as proactive interaction is enabled and adaptive considerations affect the flow of a transaction.

Queue 113 is a high-performance queue both in the sense that it is a virtual queue and in the sense that processing in queue occurs according to optimization through algorithm. Empirical testing using queue and processor simulations has shown successful processing speeds using various mixes of media types attributed to interaction requests. In actual practice of the invention, queue 113 and processor 112 described with reference to FIG. 1 above may be hosted in a same machine wit interaction server 109.

It will be apparent to one with skill in the art that there may be more or fewer of differing media types represented within queue 113 than are illustrated in this example without departing from the spirit and scope of the present invention. Those illustrated represent exemplary possibilities used for explanation of the present invention according to one of many different combinations of queue arrangement and media capabilities of the hosting system. Similarly, a single icon may in fact represent more than one media type wherein the actual model attributes ultimately define the routing parameters and media channel of any event in queue.

It is noted herein that once an event in queue 113 has been processed for routing determination and media channel a routing view or "snapshot" becomes available to any system component that requests such a view. Route views can be collectively viewed in one or more media types or by other criteria such as perhaps common routing destination. As interactions occur and are disposed of within the system, all interaction parameters including multimedia and text are captured and recorded and are recoverable using interactive interaction threads in an object-oriented manner as described with reference to U.S. Pat. No. 6,332,154 in description of CINOS. This process can be performed in a distributive fashion or centrally using the resources of interaction server 109 described with reference to FIG. 1 above.

Figure 3:
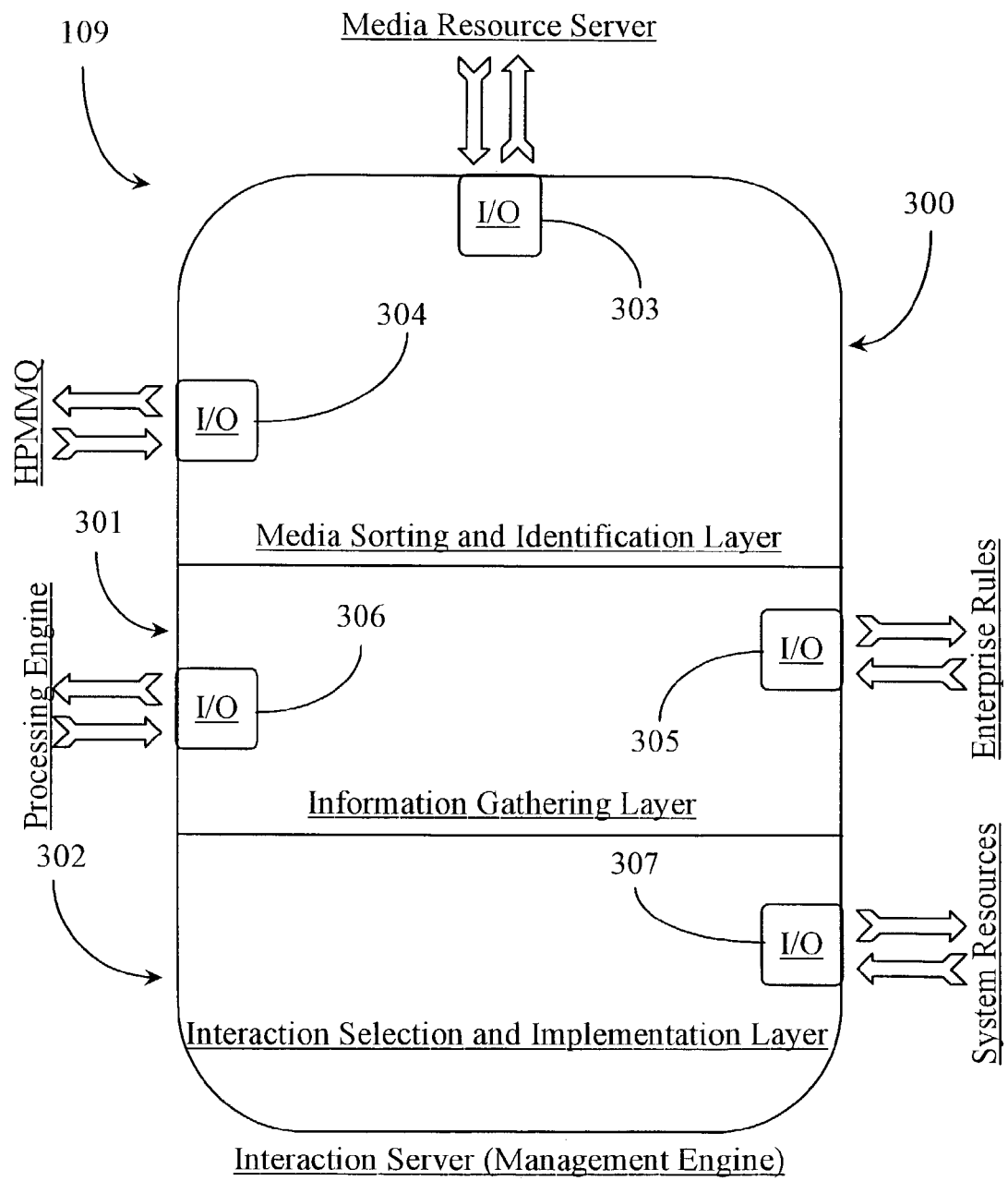
FIG. 3 is a block diagram illustrating an Interaction Management Engine according to an embodiment of the present invention.

FIG. 3 is a block diagram illustrating Interaction Server 109 of FIG. 1 according to an embodiment of the present invention. Server 109 provides media channel selection for pending events in queue as was previously described with reference to FIG. 1. While CINOS (U.S. Pat. No. 6,332,154) is a structured operating system and network with client interfaces and access portals, the system of the present invention is more a "platform" that streamlines much of the interface software and application program interface requirements of CINOS. The system of the invention termed the "B2 platform" by the inventors provides complete modeled views of virtually every interaction and chain of interactions that may occur in communication with the enterprise.

Interaction server 109 is a machine-hosted software application that contains an interaction management engine (not shown) that performs the processing required to enable media channel attributes to be selected and applied to communication. A media sorting and identification layer 300 is provided within server 109 and is adapted to identify and sort between all available media that may be used in communication between an entity of the enterprise and a client. An information gathering layer 301 is provided within server 109 and is adapted to gather the required information for making a connectionist decision about which media channel or channels is appropriate for any pending interaction.

As was previously described with reference to FIG. 1, server 109 provides the following services:
Resource presence and knowledge information
Resource Discovery/Routing intelligence
Collaboration Management
Interaction control
Context Maintenance
Media Channel Integration
Ad-Hoc Conferencing (EAR)

An I/O communication port 303 is provided within layer 300 of server 109 and is adapted to enable bi-directional communication with a media resource server illustrated with respect to FIG. 1 above as media resource server 108. The media resource server makes available all of the latest media parameters to the enterprise for any supported media type. If a new media channel becomes available or a previous media application is updated to a newer version, the media resource server is responsible for updating the same to server 109.

Server 109 has an information-gathering layer 301 adapted through I/O interface to gather needed information to enable a connectionist decision of what type of media to serve for a pending event. Server 109 has an I/O port 305 adapted to enable bi-directional communication with an enterprise rules server analogous to server 111 described with reference to FIG. 1. Server 109 also has an I/O port 306 adapted for bi-directional communication with a processing engine analogous to processing engine 112 described with reference to FIG. 1. Using the described I/O interfaces, layer 301 gathers any important information like skills assignment information, any proactive orders that may affect media type, and adaptive considerations that have been made, and any workforce management directives if the event for media selection is that type of event. In one embodiment, instead of communicating with the queue-processing engine directly for attributes concerning an event in queue, I/O 304 is used to obtain the information after it has been applied to the pending event. In other words, the attributes assigned to the event model are known before media channel selection is made.

Server 109 has an interaction selection and implementation layer 302 adapted for serving a command to assign a media channel to an interaction. The term interaction server is not literal in the sense that only a media type or types assignment is made for a current interaction pending in queue. Layer 302 has an I/O port 307 adapted for bi-directional communication with all other system resources for the purpose of issuing commands related to media channel selection and execution of the appropriate media types that will be used in the pending interaction. It is noted here that server 109 may simply assign an asynchronous notification for an outbound operation. In a more complex scenario, server 109 may initiate new events by selecting a media channel for an event pending and additionally, a second media channel to be used concurrently with the pending interaction. For example, an IP voice interaction can be supplemented with a "follow me" browsing session that is triggered as an additional event between the same client and an agent of the enterprise, the event spawning as the IP voice session ensues.

In addition to the processing layers of server 109, a section (not illustrated) is reserved for EAR session maintenance. In another embodiment, server 109 would only set up proactive EAR sessions but the actual complex interaction would be hosted in another server, perhaps a Web-server.

It will be appreciated by one with skill in the art that a media channel can enable any virtual event with a media type assignment of either a unidirectional nature or in a bi-directional interactive sense. For example, if a client calls into the communications center using a COST telephone, then the media type of the event is already known and represented in the virtual queue as a telephone icon before routing determination or other considerations are made for the pending interaction. However, it may be decided that a COST interaction will not be the best media type for engaging in the business process related to the initial call. Therefore, server 109 may make a decision that the caller and the center will be better served if an automated e-mail is sent immediately to the caller instead of a possibly long telephone interaction with a live agent. In this case the media type of the event is reassigned and IVR interaction can be used to inform the caller that an e-mail containing all of the requested information is on its way and may thank the caller for phoning in.

An interaction or business chain represents all of the interaction required for initiation and closing of a defined business transaction. A transaction can be simple like initiating a purchase request, submitting payment preferences, and confirming the order. However, the transaction may not be considered closed after confirmation: The product still has to be scheduled for shipment to the client and shipped to the client. Therefore, a business chain may include proactive post transaction interaction with a client. A business chain may be much more complex than a simple transaction.

Interaction server 109 may be called upon to assign media to a proactive event triggered by an enterprise clock related to shipping or to maturity of an account, or to any other process that may be triggered according to a preferred time. In this case, an outbound event is triggered according to time constraints to be sent to a particular client or business partner. However, the client or partner may have a schedule that will render the timed interaction or notification ineffective. Interaction server 109 can access client data for information related to a preferred media type and contact parameters in the event of notification occurring at a specific time such as when according to known schedule a client is unavailable at a traditional contact parameter set. Therefore, server 109 may in some special cases also apply routing attributes in addition to a media channel for a pending proactive event that is a timed event or that is triggered by some adaptation by the system to a detected event.

Interaction server 109 is not required to select media types for all interactions that will occur within the communications center. Server 109 may be adapted to select media only for outbound events or a specific combination of outbound and inbound contact requests. Configurationally speaking there are many possibilities. It is possible though that all interactions that occur have the specific media types selected by the system instead of by agents or clients of the center.

Figure 4:
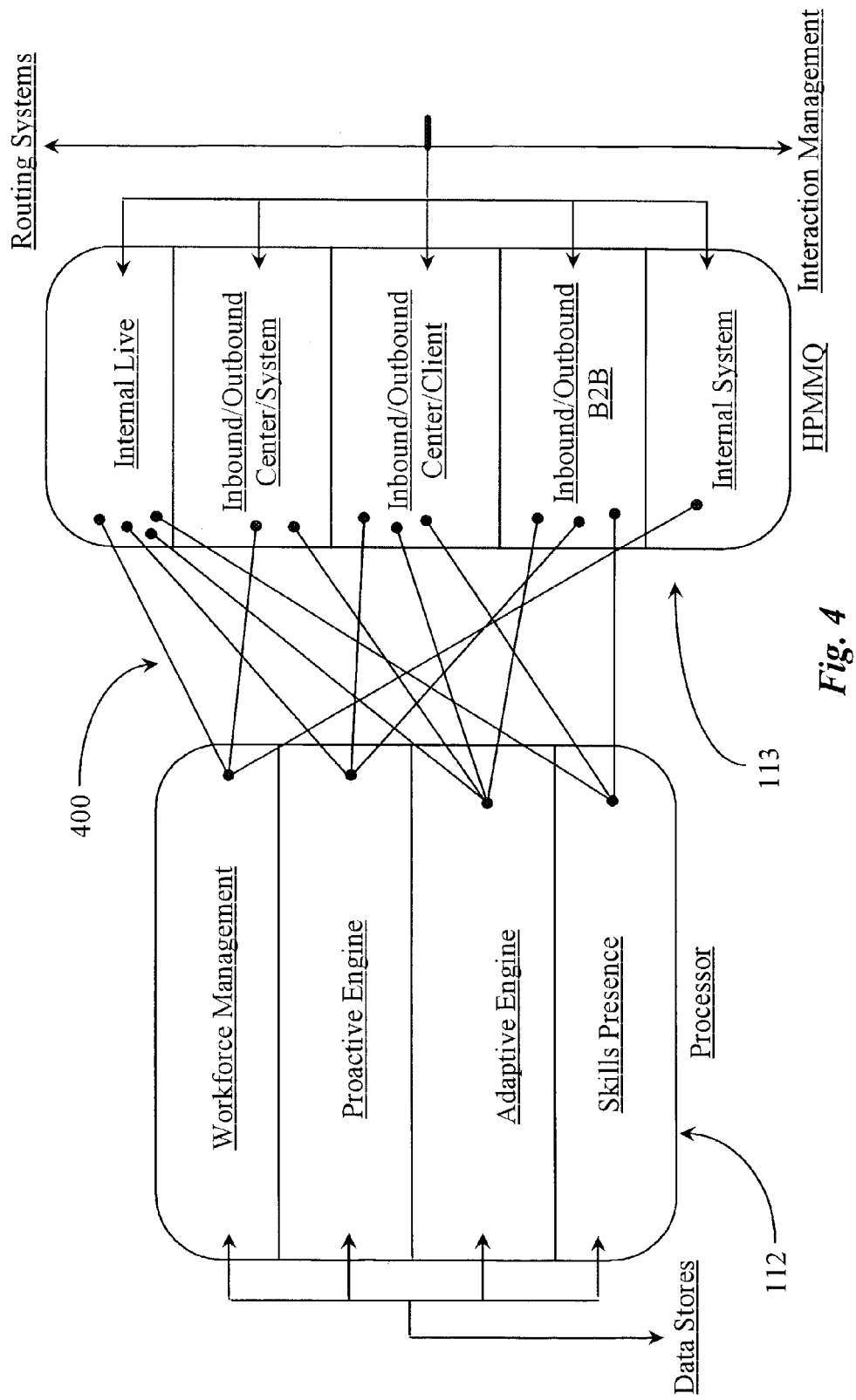
FIG. 4 is a block diagram illustrating cooperation between the processing engine and multimedia queue of FIG. 1.

FIG. 4 is a block diagram illustrating the processing engine and multimedia queue of FIG. 1. Processing engine 112 applies specific attributes to events or "interactions" within queue 113 according to enterprise rules as previously described. Engine 112 can also instantiate new events having attributes that fall under proactive and adaptive rules. In this example, queue 113 has 5 partitions for organizing queued events. Reading from top to bottom the partitions are as follows:

Internal Live communications

Inbound/Outbound Center/System communications (automated)

Inbound/Outbound Center/Client communications (live or automated)

Inbound/Outbound business to business (B2B) communications (live or automated) and Internal system communications (automated)

Internal live communications are characterized by internal telephone calls, IP voice calls, internal collaborative applications, messaging, chat, and any other supported communications application that is considered a live communication tool. Workforce management issues, proactive contact issues, and skills presence issues can affect these communication events. The workforce management engine of processor 112 can initiate interactions that have a theme of conducting workforce management. Most of these interactions will be automated notifications of duty assignments or reassignments, machine repair requests, and the like. Some workforce management interactions might be internal live interactions. For example, a supervisor may get a notification to contact agents of group A in the technology sector using a live media and give them the following reassignments. The re-assignments may be required for example, as a result of an e-mail server malfunction and the re-assignment might be to replace e-mail duties with COST telephone duties.

In one embodiment, a simple outbound notification may be triggered that will pop-up on each target agent computer screen, which would fall under the domain of internal system communications. However, to make sure everyone gets and understands the re-assignment, a series of live telephone calls might be triggered. The system has adapted to the event of a down server and has proactively triggered the notification calls. The supervisor charged with placing the calls may simply have to answer a series of "inbound calls" that are automatically triggered and queued as internal live events. Each one that is answered connects the supervisor to one of the targeted agents. The supervisor does not have to manually place the calls. Therefore the interactions are managed through the access resource server described with respect to FIG. 1.

Inbound/Outbound Center/System communications are automated notifications and request/response interactions initiated between communication-center systems and externally held systems. Inbound/Outbound Center/System may also include B2B transactions. These events can be simple machine requests or notifications using machine language protocols or messaging that is machine-readable. These event types can be affected by workforce management issues, proactive contact issues, and by adaptive issues. An external system might be that of a supplier of goods that is set up to communicate and report to a center system like a supply chain management (SCM) system. If, for example, a shortage of on-hand product is detected by the enterprise, the system may trigger one or more outbound notifications, which seek to acquire more product through increased shipping for a specified period of time until the shortage no longer is detected. In such as case, a proactive outbound notification that interrupts the normal product flow chain is sent to one or more systems responsible for product inventory and delivery. The shipping numbers are automatically updated for the stated period after which normal shipping ensues.

Adaptively, the system could after a number of forced shipping increases have occurred, adjust the traditional quantity of product shipped over time to reduce instances of shortages. Workforce management might be triggered to initiate an outbound communication to seek or recommend increase in shipping personnel associated with the remote location in order to physically meet the higher demand for product.

Inbound/Outbound Center/Client communications represent live or automated communications of virtually any media type between the center and traditional clients like a customer base of repetitive customers. Proactive communication, adaptive communication and skills presence issues affect these types of events. The system maintains information about clients including itineraries, media types available to them, payment histories, contact information sets, and preferred media types for contact. New clients are automatically entered into the system and are surveyed for additional information used in proactive and adaptive scenarios. The skills presence engine provides skills routing information for incoming, and in some cases internal live events. The proactive engine provides preferred or time specific contact information for outbound notifications to clients that are machine automated or manually initiated. For example, if a specific product can no longer be offered with a certain feature but there are 20 clients that have already placed orders for the product with the feature then a proactive outbound notification campaign is launched to notify clients of the situation.

The notification campaign will not necessarily be conducted over the same media types because media types available to the clients vary as well as the times that they can be reached using the available media types. Furthermore, the enterprise rules may require live intervention because of the fact that there may be some cancelled orders. Perhaps another product exists that still has the feature and all of the basic function of the ordered product. In this case, the options are cancel the order, switch to the other product that still has the feature, or accept the current order without the promised feature. A live interaction would be best suited for mitigating the 20 transactions. When the outbound list is submitted for contact, the adaptive engine works with the interaction server to select the best "live" media available to the client under the circumstances and according to history. As a result, some of the calls will be telephone calls, some will be cellular calls, a few might be IP telephony calls, one or two may have to be automatically notified of the situation because no live media is available to them because at the time of contact they are mobile and have access to only a pager.

Media channels are selected according to priority in this case because of the circumstance and value of all of the existing orders. Those that have to be paged or notified by other than live synchronous media can be automatically notified by the system without agent intervention provided that the product number, purchase orders, and problem statement is known. Those paged will be provided with the agent's direct line number, the correct purchase order, and if voice activated, a short prompt stating there is a problem with your order.

Through proactive and adaptive interaction management clients are contacted using the best media to ensure successful contacts. The contact attempts are tracked by the system so that the agent is relieved of the responsibility. If the clients who were originally paged do not call in by a certain period of time then another contact attempt, perhaps using another media type will be made automatically.

Inbound calls from clients may in one embodiment be treated as normal inbound calls answered using the same media type as the call. In this case the events are queued virtually but the media type is a given and will be routed to an agent utilizing the same media type that is available. However, if the client is a repeat client whose available media types are known to the system, the system may make a recommendation to the client to switch media types for interaction based on the reason for contact, which may be elicited through IVR interaction. For example, if the client initiates a COST call to a live agent to check an order status, the IVR system may prompt the caller with an option to have the status e-mailed to is e-mail address and offer not to charge the client for the telephone call. The event in queue then is not routed but switched to an outbound e-mail, which is automatically generated with no agent intervention. Other media types may be offered depending on the clients' state and agent availability.

Inbound/Outbound B2B communications represent live and automated communication between the center and business partners, suppliers, and other third party systems or applications. Customer relations management (CRM), product value management (PVM), supplier relationship management (SRM), product chain management (PCM), product life-cycle management (PLM), and product value management (PVM) make up some of the types of automated systems that can be in place and in constant communication/integration with one or more enterprise systems. These types of interactions are largely automated data sync operations, process and result reporting operations, logging operations, and real time management operations. A single business process may contain many smaller operations each operation dependant on one or more communication events. The proactive and adaptive portions of the system of the invention are also used in everyday business processing in order to streamline and refine processes and to make them adaptive to events that may affect some B2B operations.

Internal system messages are automated system-to-system or even machine-to-machine messages that can be in the form of automated instant messaging (IM) or other machine-readable messaging. Workforce management applies to this type of event. Workforce management is largely automated and system-to-system messaging for example, from a load balancing system to a group of agent machines may be used to convey workforce re-assignment duties according to current event loads. Moreover, when agents first log into the enterprise system workforce messaging may be used to assign initial communication center duties.

The ability to trigger automated outbound events involves dynamic generation of interaction models that define a pending interaction in terms of the object class, type, and attributes. Attributes include contact parameters, media type or types, connection parameters, and content text or voice attributes. In some cases, outbound events are automatically triggered that will involve live interaction over voice or interactive text channels. Content then is added dynamically during interaction.

An interaction is defined for the purpose of this specification as a dynamic state between at least 2 parties using one or more media types. An asynchronous unidirectional message itself does not define an interaction however a series of asynchronous messages that are related and are part of a transaction or other business process would be an interaction.

A business process or "vertical application" defines any particular generic process that has a start and end. A transaction can be defined as a business process having an initiation, some intermediary steps and a close operation. B2B management processes related to customers, product, value, and the like are business processes that are generally more complex than are simple transactions. For any type of enterprise the vertical applications are modeled as generic templates that define the basic process or processes required to successfully complete the business of the application. Depending on the type of application, communication events of varying media types can optionally be attributed to and instantiated within the process to complete the business process defined.

Proactive contacts can be part of the defined generic process or can be added to the model dynamically based on the occurrence of some event. The contact parameters, media types selected, and media channel parameters are all dynamically added attributes that are determined based on known information. The intelligence required to model and trigger proactive events is a compilation of enterprise rules and aggregated information that defines client state and business state. As events occur that effect an area of business, proactive scenarios are dynamically modified to reflect new interactions necessitated by the change in state.

In some embodiments unforeseen changes may happen that are not defined as possible states in any vertical applications. Manual intervention may in some cases be required to incorporate the new state possibility into the appropriate business model portion so that the next time the particular state occurs proactive scenarios can dynamically occur. However many perceived states of business can be modeled as possible attributes of related applications. One example would be perceived product shortages that would affect customer-shipping parameters. A shortage of an amount for any shippable item that is greater than a defined amount (stock buffer) could be a modeled state that if detected could trigger automatic proactive contacts to all customers expecting shipment at the time of the state of business change.

Referring now back to FIG. 1, interaction server 109 or access resource interface 116 (optional embodiment) maintains a current state of availability of all media-based resources available to all active agents and automated systems logged into the enterprise grid. This state is also used in routing determination for incoming events. The system "knows" exactly what agent resources are currently available and unavailable. The system also enables agents themselves to subscribe to resource views of other agents for collaboration and event transfer purposes. For example, one agent may be involved in an interaction with a client using IP voice and during the interaction decides that a technical document needs to be transmitted to the client. But the current bandwidth available to the agent is less than optimal while interacting with the client over the IP voice channel. The agent can "view" the IP bandwidth availability of other agents and can initiate a message to another agent with optimum bandwidth availability to send the document to the customer while the agent is conversing with the customer. There are many other possible scenarios.

Figure 5:
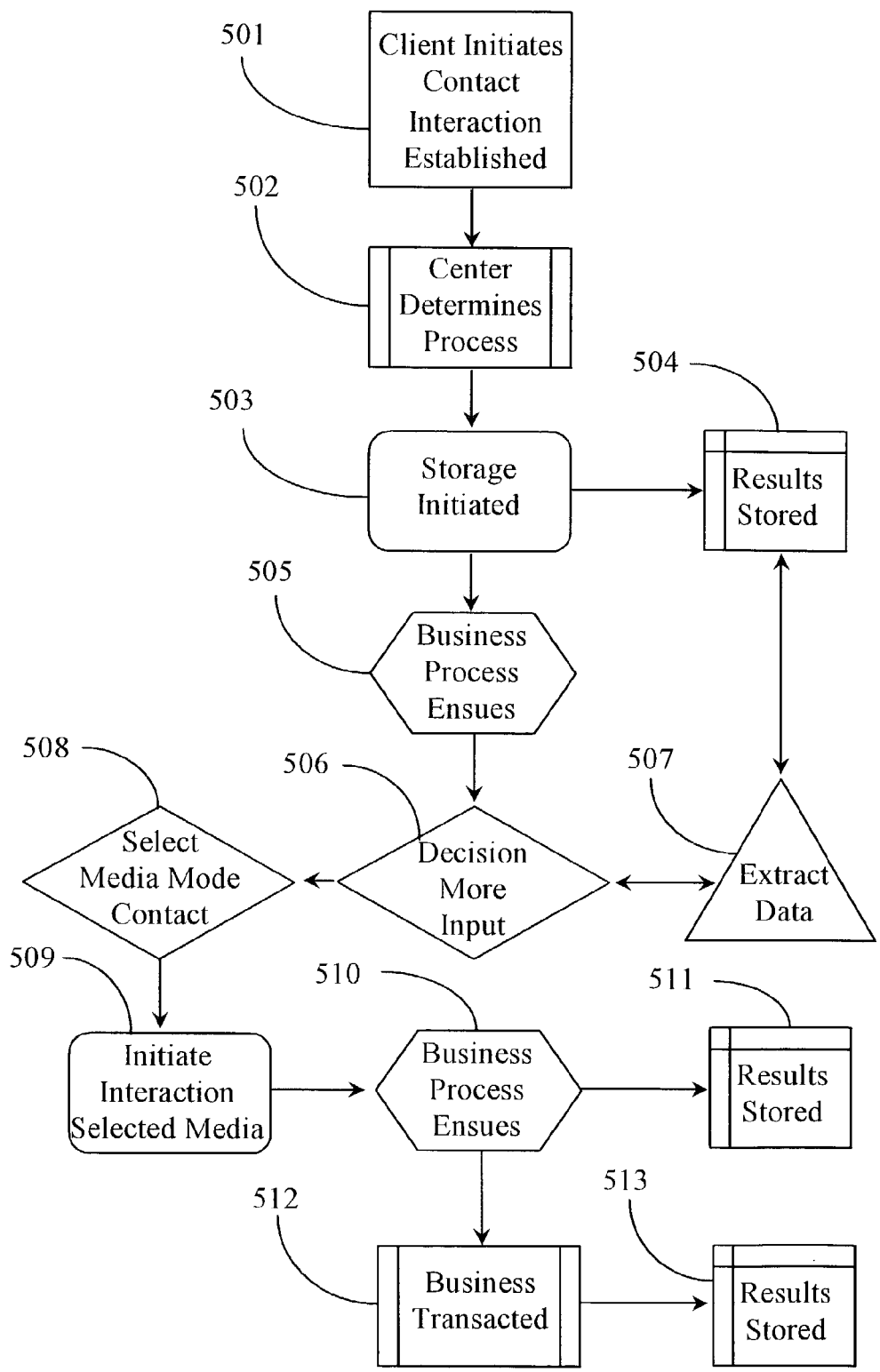
FIG. 5 is a process flow diagram illustrating a proactive client/center business flow chain according to an embodiment of the invention.

FIG. 5 is a process flow diagram illustrating a client/center business flow chain with a proactive contact according to an embodiment of the invention. At step 501, a client initiates a request for contact. The client of step 501 may initiate the contact according to any available media. The request is received within the center at a virtual multimedia queue analogous to queue 113 described with reference to FIG. 1. The reason for the request is determined by the center system at step 502. For example, if the request is a COST telephone call, the IVR system interacts with the client before routing to determine the reason for the call and to solicit any additional information that is deemed appropriate. Other media types lend to other known methods for determining the reason for the request before routing. For example, e-mails may be parsed and Web-forms are dedicated to a particular process.

At step 502, the center determines the process that reflects the client intent. It may simply be an order or an availability request. It may be a loan request or a service inquiry. The system matches the client intent with a known vertical application or process. In many cases the process identified may be an automated process with no agent interaction. In other cases the process will include live interaction. Resource availability is determined and routing to a final destination is performed.

At step 503, interaction is established. If the media type of the interaction is live voice, interactive text-based, or asynchronous messaging, the interaction content and any results are stored at step 504. At step 505 the business process ensues meaning that interaction is still ongoing and the purpose of the client has yet to be satisfied. It is noted herein that further routing, re-direction, transfers, and other steps may be art of the process. Further, the entire interaction chain is captured and recorded as it occurs. It is further noted that the end of a process does not necessarily mean the closing interaction of a transaction. The definition of process may include, for example, post-closing operations that still need to be performed.

At some point in the process (step 506), the system makes a decision that more input from the client would be required to complete the process according to the client's original intent. This decision may be made on some time parameter that expires without a completion of the process. It may be a proactive decision based on some enterprise-known event that has occurred between the time of step 501 and step 506. One example would be locking in an interest rate in a mortgage application process. The lower rate was detected by the system and the decision was made to give the client an opportunity to lock in the new rate.

At step 507, client contact object (preferred contact set) is extracted from a history-based data store analogous to HDM described with reference to FIG. 1 above. The extracted data may be the contact information that was determined to be the "best" information given some criteria or set of criteria that reflects a current client state. For example, at the time of the proactive decision the client is likely at his workplace. The contact parameter set for the client's workplace is then extracted.

At step 508, the system selects a media mode or channel for initiation of the proactive contact. This selection may be an adaptive selection based on history data reflecting a series of contact attempts made at the client workplace using several different media types. Also the client may have a preferred contact media type listed as a prioritized media for workplace contact. If so then the etiquette rule may override a media selection if it is other than the listed media type or preference.

At step 509, an automated proactive contact is initiated using the selected media type. For a simple message notifying the client of a new lower interest rate, it may be that a simple outbound notification e-mail or instant message in generated. Content parameters and intended purpose of a proactive contact may also determine in part which media will be selected for the contact and whether the contact will be synchronous or asynchronous.

At step 510, the business process is still open and ensues. At step 511 results of new interaction of steps 509 and 510 are stored. It may be that the client locked in the new rate and subsequently submitted the required paperwork or on-line document with a signature. In such as case then the process may be considered closed from the client and from the enterprise perspective. Therefore the business process is transacted or completed at step 512. Results of the transaction are stored at step 513.

In some cases, the transaction or process may not be complete until other steps are processed after the client has confirmed and submitted all requirements for the transaction. Further steps such as delivery of the service or product to the client and post transaction interaction regarding follow-up surveys or inquiries may be part of the process, in which case more steps would be required and further proactive measures may be made. As well, the process outlined in this example may resolve to a separate process that deals with post closing issues.

It is noted herein that if the proactive decision to contact a client uses live media with agent participation, the target agent would receive the event as an incoming event of the selected media type. The agent would also be notified with separate mechanisms if appropriate ahead of the incoming event so that he or she may familiarize himself or herself before interacting.

It will be apparent to one with skill in the art that there may be fewer or more steps including sub steps illustrated in this example without departing from the spirit and scope of the present invention. The exact number and order of steps is dependent entirely on the nature of the modeled process, any occurring events that might trigger proactive customer care or contact, and the types of media used.

Figure 6:
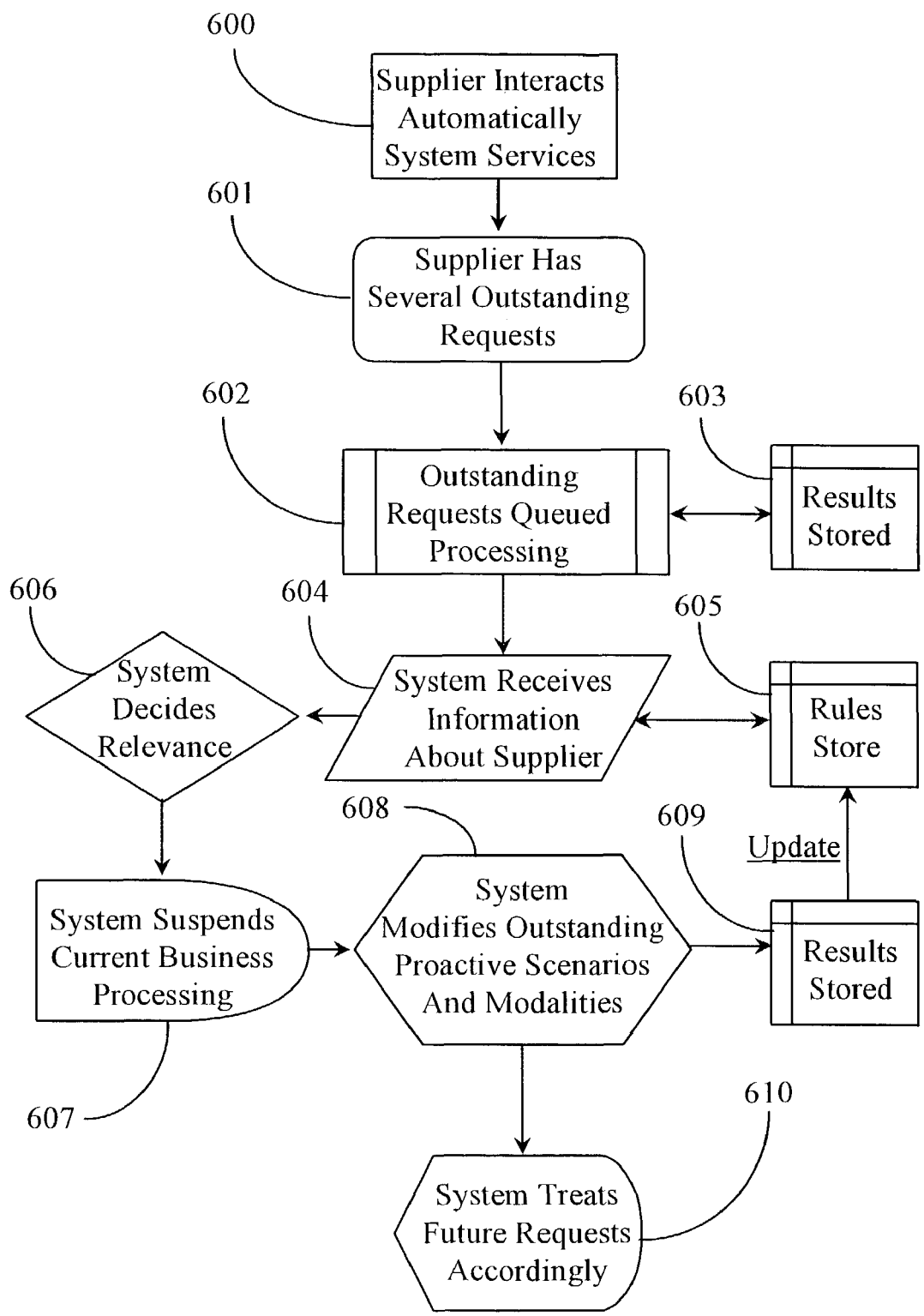
FIG. 6 is a process flow diagram illustrating a proactive supplier/center business flow chain according to an embodiment of the invention.

FIG. 6 is a process flow diagram illustrating a supplier/center business-flow chain with a proactive scenario according to an embodiment of the invention. At step 600 a supplier interacts automatically with enterprise system Web-services from an external server. Typically such services are established between an enterprise and supplier to carry on standard and ongoing business including any reporting requirements.

During Web-service interaction there will be several outstanding requests lodged at any given time (step 601) wherein the requests require some response action from the enterprise. Requests at step 601 may actually relate to one or more processes ongoing between the enterprise and the supplier and may be made through one or more Web-service interfaces.

At step 602 outstanding requests are queued for processing in a queue analogous to queue 113 described with reference to FIG. 1 above. At step 603 the content and any results of request processing are stored. The type of B2B request and response interactions are largely if not wholly automated and happen in the background of enterprise primary functions.

Assume that an event related to the suppliers business or directly involving the supplier itself occurs and becomes known to the enterprise as illustrated at step 604. The event could be related to the supplier's state of business and may affect any outstanding requests pending resolution within the enterprise. At step 606, the system decides if the event has relevance to the ongoing business being conducted between the entities. At step 605, the system consults with a rules database to help determine relevancy decided at step 606.

If the nature of the event is relevant to ongoing business and will affect at least one or more processes ongoing between the two entities, then at step 607 the enterprise system suspends any current business processing and any outstanding requests at least related to identified processes that are affected by the event.

Depending on system determination and process rules at step 608 the system modifies all outstanding proactive scenarios and modalities used in responses to the supplier. This may include canceling of some services and modification of other services including modification of interaction requirements. All results are stored in step 609 including updates of any new rules that are created for future interaction with services that are not suspended or cancelled.

At step 610 the system treats all future interactions with the supplier according to the new rules for interaction until a new event is detected that may neutralize or nullify the previous event. It is noted herein that some events are predictable such as a change in universal credit rating or a dip below a specific value in stock trading. Of course some events may be unforeseeable and may require some manual intervention to incorporate the event parameters into the enterprise rule system before service modification and changes in interaction rules are updated.

An example of an event that is predictable and that could affect business processes ongoing between two organizations would be a bankruptcy event. Service and rule modifications can be modeled as attributes and be dynamically incorporated into the business model portion that governs business between the two entities.

Figure 7:
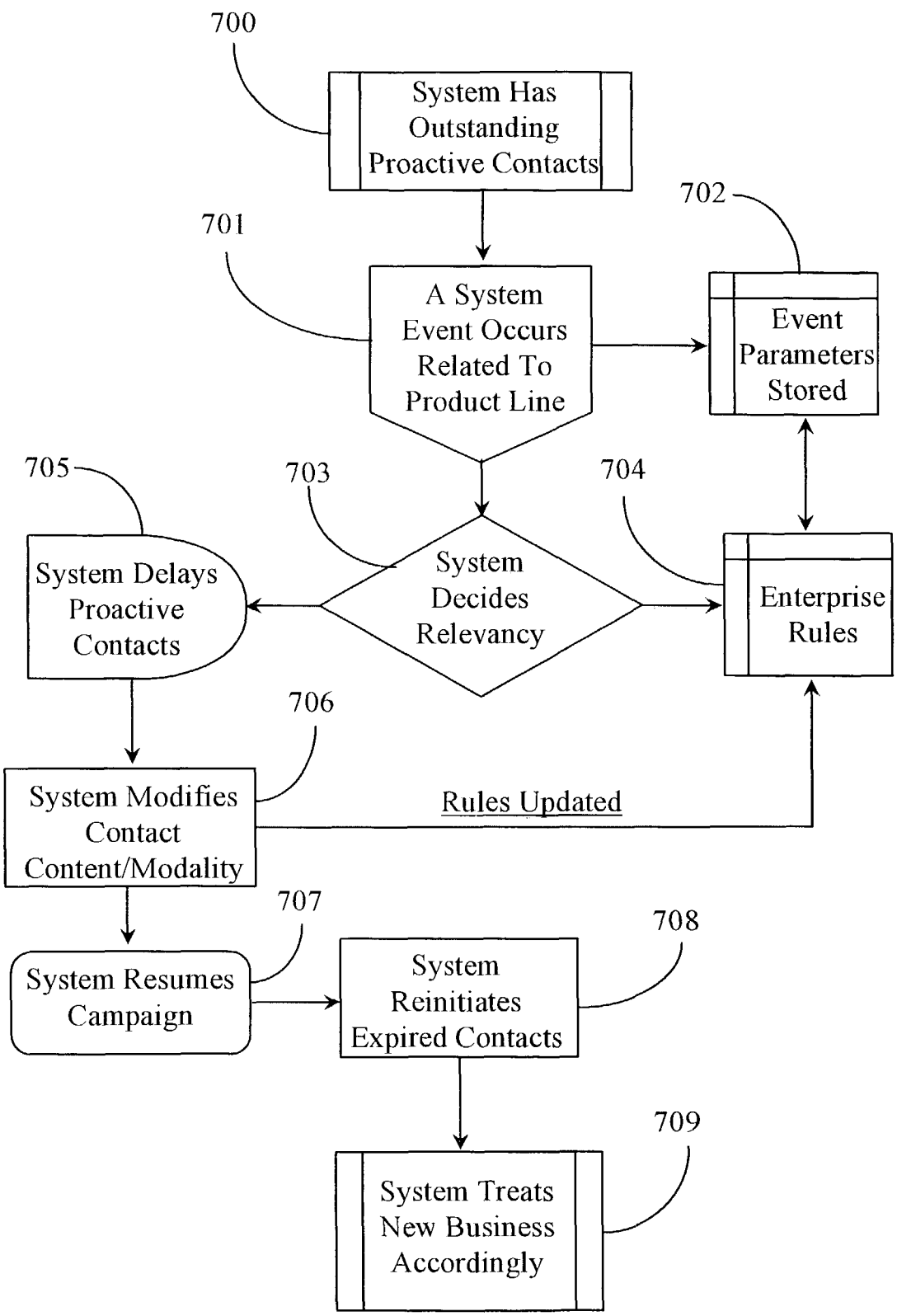
FIG. 7 is a process flow diagram illustrating a system adaptation to a business process affected by an unscheduled and related business event known to the system according to an embodiment of the invention.

FIG. 7 is a process flow diagram illustrating a system adaptation to an outbound campaign affected by an unscheduled but related business event according to an embodiment of the invention. At step 700 the system is engaged in an outbound proactive customer care campaign and has outstanding proactive contacts yet to be made. At step 701 a system event occurs related to, perhaps a product line that is the subject of the proactive campaign to customers who have received and who soon will be receiving one or more products affected by the event.

At step 702 parameters of the event are stored. The event could be for example, a feature cancellation related to a specific product in a product line, the product on order for each of the customers of the campaign. The system decides relevancy of the event at step 703 by consulting a rules base at step 704. Assuming in steps 703 and 704 that the system determines that the event will affect the current proactive customer care campaign, at step 705 the system delays proactive contacts and suspends any that are in queue.

At step 705, the system modifies the contact content and modality if required of the information that is central to the campaign. If necessary, the results of the modification are updated to the rules base (Rules Updated). Perhaps due to the event, a previous asynchronous media selected for the campaign cannot now be used because the change in the product is something that lends to possible order cancellations or switch orders to a non-affected product of the product line that still has all of the basic features of the ordered product including the new feature.

At step 706, the system modifies contact content and modality. A primary media selection is now classified as synchronous interactive media preferred with asynchronous media if no synchronous media is available. Essentially this means that the system will attempt contacting customers using interactive media if available like telephone, cellular phone, voice over IP, and so on. If due to customer state at the time of contact, the preferred media is unavailable then an available asynchronous media like e-mail or page will be selected.

After all of the rules are updated and the new rules for the campaign are established then the system resumes the campaign. This may include regeneration and re-queuing of outbound contacts to correct misleading information that may already have been sent during the campaign at step 708. At step 709, the system treats any new proactive customer care campaigns dealing with the same product according to the new rules related to the product in question now being offered without the eliminated feature. It is noted herein that the proactive care campaign was altered in intent and purpose due to the system event but that change does not affect customers who have not already ordered the product thinking that the feature was provided. Therefore future customers that order are made aware of the lack of the feature before ordering and their proactive campaign contacts can be conducted normally.

Figure 8:
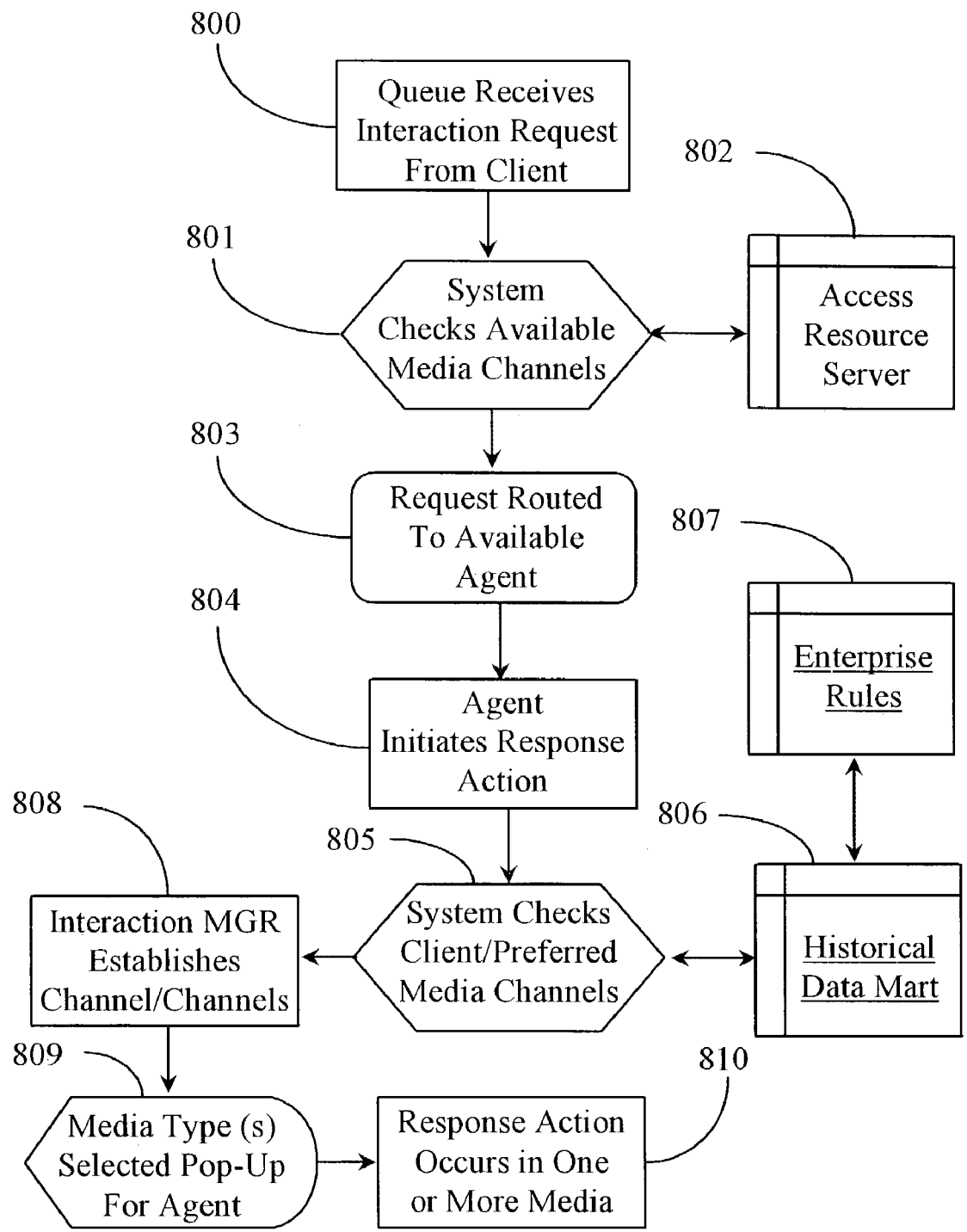
FIG. 8 is a process flow diagram illustrating steps for dynamic outbound interaction management according to an embodiment of the invention.

FIG. 8 is a process flow diagram illustrating steps for dynamic outbound interaction management according to an embodiment of the invention. At step 800 the enterprise system receives an event from a client in a multimedia queue analogous to queue 113 described with reference to FIG. 1. The event may be a COST telephone call waiting notification or any other type of routable media event.

At step 801 the system during routing determination checks available media channels of agents and systems that match the incoming event by consulting with access resource server at step 802. Other routing determinations are incorporated such as skill-based considerations and so on. If for example, the event is a COST telephone interaction, then consulting with the resource server will show all agents having an available COST telephone active.

After routing criteria is determined at step 803 the event is transferred to an available agent according to the media type of the event. After the interaction with the agent, at some point the agent initiates a response action at step 804. The original interaction may have been a COST telephone interaction, for example. However the agent may need to respond at a latter point with additional information requested by the client that could not be obtained at the time of the call. Therefore a proactive contact is needed.

At step 804, the agent decides that a response using an additional media channel other than telephone needs to be delivered to the customer at some point after the original interaction. The agent initiates a response or outbound contact at some point after the original interaction. The initiated event does not necessarily have any media assignments at the time of initiation but the intent or purpose of the initiated contact is made known by the agent for media selection purposes. For example if the agent has decided exactly what media type should be used then that media type will be selected. Some types of content, for example, demand specific media types. On the other hand, if the agent is not sure which media type should be used and more than one type can be used then the system can make the selection based on a type of information the agent whishes to send and other criteria.

At step 805 the system checks any preferred media type for contact and/or the success statistics related to past contacts using the available media types accessible to the client. Step 805 is aided by a step 806 wherein the system accesses a historical data mart analogous to HDM within facility 114 described with reference to FIG. 1 above. Statistically, a specific type of media type available to the client may have the best historical record of success in response from the client when used. In one embodiment weight factors may be assigned to all of the client media types so that the most successful types are always chosen if their weight values dictate at the time of contact initiation. Client preferred media including etiquette rules might be considered as well as any alternate sets of client contact media types that may be applicable if the client moves from a primary location to another location.

Selection of the media type for the agents response information is preferably directed so that contact is guaranteed without pestering the client by duplicating information to the client using more than one media type available to the client. In this way the client receives information without being pestered with multiple copies or notifications of the same information.

At step 808 an interaction manager within an interaction server analogous to server 111 described with reference to FIG. 1 above establishes the media type or media "channel" that will be used to interact with the client. The media type selected will, if a DNT type media, "pop-up" on the agents screen at step 809 with the client address and in some cases subject description and some content for the agent to complete the information and send the information. For example, if the media type selected is e-mail, then the e-mail application of the agent executes to the point of the message ready screen having the send to address and possibly any CC and BCC addresses inserted as well. If the media selected is a COST telephone channel then the system would place the outbound call and when the client answers the call the system would transfer the call to the agent as an inbound interaction. An agent may override this automated media type selection process, for example, if the client and the agent had agreed which media type to use to send the information.

At step 810, the response is executed and concluded in the media type selected and the agent can then close the application. Some media types selected will execute as inbound interaction events from the viewpoint of the agent. In this case, a pop-up window can be directed to an agent GUI informing of the incoming event and reminding of the event purpose. If the selected media is a notification type media that does not require agent participation such as an automated fax or automated e-mail wherein the content and subject matter is routine then the agent simply initiates the outbound contact by indicating a proper message or notification code and the system can still make a media selection for the automated message among more than one automated system at work in communication center.

In one embodiment of the invention, during interaction with the client at step 803 the agent may also add interaction media types to the current session. Traditionally this is a concerted effort between client and agent discussed at length during the open session and not always successful because of miss-communication or wrong execution maneuvers such as not properly executing a conference call so as to successfully add a third party to the session. However, using the interaction server and if required the media selection manager, the agent may initiate, for example, a co-browsing session while interacting with the client by telephone. The media services will set-up the execution of the session on both ends provided the client has installed a client plug-in application adapted for the purpose. The co-browsing session can be opened in this way without manual look-up and physical execution of the browser applications.

One with skill in the art will recognize that in some instances ordered media types and other executions such as event transfers, conference in to session, and so on may be agent-directed with the agent already set on the media type and content parameters. In this case an agent may fully override the interaction management system in terms of media channel selection. However event transfers and conferencing in are still subject to agent and media type availability. During attempts to add more media types and participants to a session, the interaction management system may still make recommendations to agents as to other available media types and resources can be used for the intended purpose. There are many possibilities.

Figure 9:
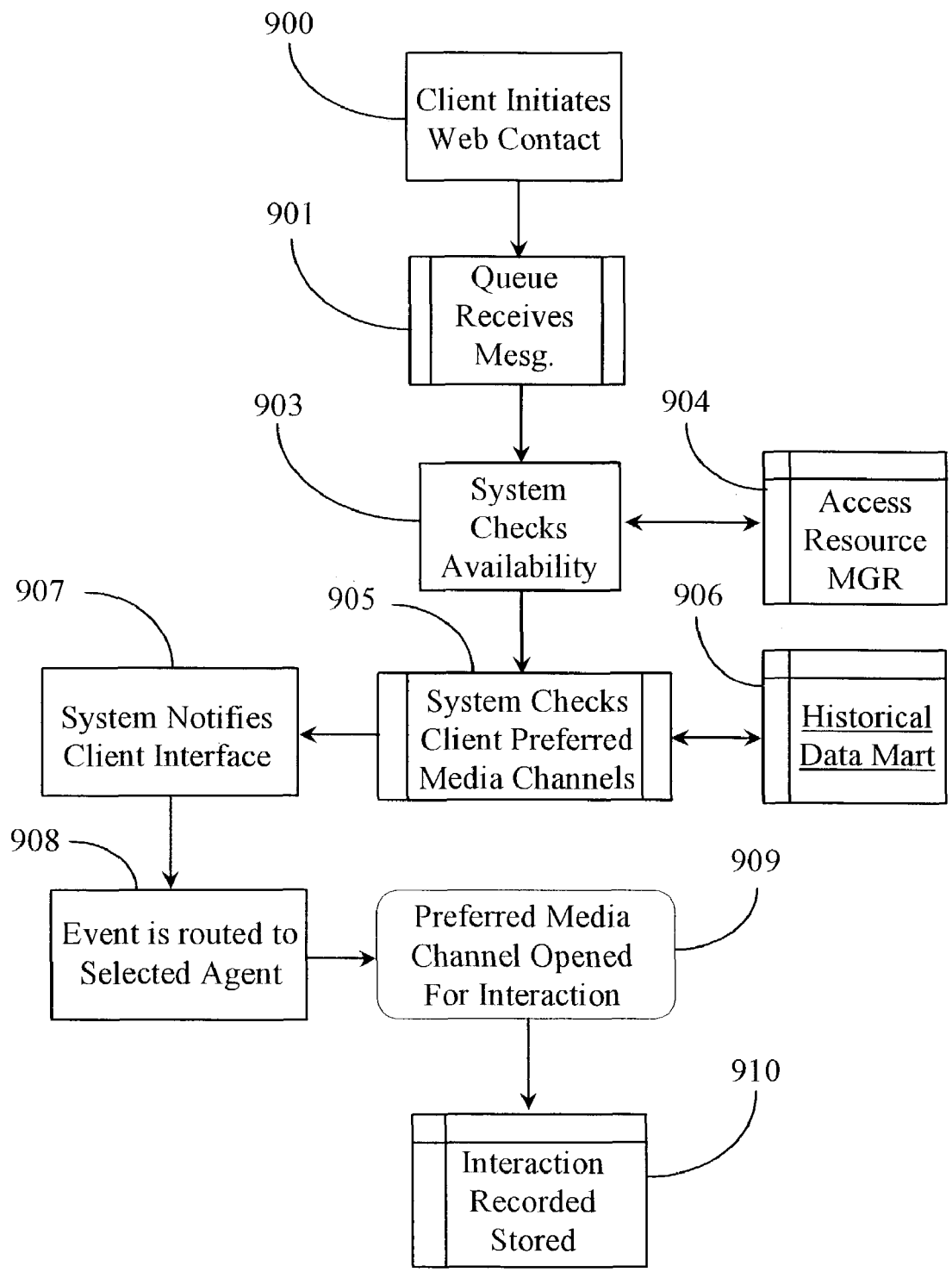
FIG. 9 is a process flow diagram illustrating steps for dynamic inbound interaction management according to an embodiment of the invention.

FIG. 9 is a process flow diagram illustrating steps for dynamic inbound interaction management according to an embodiment of the invention. At step 900 a client initiates a Web-contact request through a Web-service or client interface maintained by the enterprise. The client may be a single customer or a business client. The contact vehicle is essentially a Web form requesting contact where a media type for contact is not specified. The purpose and intent, subject matter of request, order number, and other information may be required on the form. Traditionally, web-forms order a specific media type for contact or response back. According to an embodiment of the present invention the decision of which media type to use is system-decided.

At step 901 a queue system analogous to HPMMQ 113 described with reference to FIG. 1 receives the request. The request is analyzed for intent and purpose for possible media types that can be used to satisfy the request. At step 903, the system checks availability (routing, media types) with the aid of a step 904 for consulting with an access resource manager analogous to access resource server 116 described with reference to FIG. 1 above. The system is concerned at this point in identification of available agents with the skills and media types available that could satisfy the request. At step 905 the system checks client preferred media channels or types and any etiquette rules and so on. This step is aided by step 906 for accessing the historical data mart describe previously in this specification.

At step 907, the system contacts the Web-server interface of step 900 and indicates a selected media type for interaction. The indication may simply say that "an agent will contact you shortly by way of COST telephone", or "you will shortly receive an invitation for a co-browsing session". This assumes of course that the request involves live interaction and that the agent will initiate the contact. The service can be activated and offered through a Web-server acting as a proxy or at the client-end node through an installed client application.

The client event does not lose its place or priority in queue and the media type and contact parameters including selection of an agent for the interaction are all decided while the event waits in queue. The event "takes shape" while waiting in queue. At step 908, the event is routed to the selected agent in a form dependent on the media type used. At step 909, the agent receives the interaction in the media type selected. For example, if the media type is a COST telephone call then the agent's telephone would ring as an inbound interaction. At step 910 all interaction between the client and agent is recorded and stored for record and are recoverable. One with skill in the art will appreciate that there may be more or fewer steps included in the process described in this example without departing from the spirit and scope of the invention. One variable is selected media type, which depending on the exact type used may affect the number of steps in the process.

Skills Discovery Network

In one aspect of the present invention a skills discovery method is provided for maintaining a skills network mapping of skills and for enabling automated discovery of local (internally defined) and remote (externally mapped) skills available to personnel and systems operating within the domain of an enterprise system, which may be a multimedia communications environment. The methods and apparatus of the present invention will be described in enabling detail below.

Referring now to FIG. 1, communications center 104 is part of a multimedia communications environment, which may include other centers and third party domains based in or reachable through networks 103, 102, and 101. As such, an enterprise grid may be defined to include facilities, including other contact or communication centers that are external from the physical domain center 104.

Skills discovery, processing and routing involve interactions between the Skills Presence (SP) component of processing engine 112, interaction server 109, queue 113, backend database facility/middleware component 114, and agent/systems 129 generally referred to hereinafter in this specification as access points. The term skills, as defined in this specification refers, to a variety of attributes that are associated generally with communication-center objects, which are broadly defined as resources. For example, an access point has a media skill set defining the available types of media that the access point can work with. Traditional skills are also defined broadly as business skills pertaining to types or classes of skills, namely product knowledge skills, system resource skills, and language skills.

SP component of engine 112 works with interaction server 109 and routing algorithms to optimize routing of interactions by injecting current skills presence data including available media "skills" into the routing process. SP component 112 is further adapted to process discovery of non-traditional skill sets that avail themselves through contacts to resources coveted by certain access points within the system. While skill-based routing has been practiced and is known to the inventor, a novel component of SP within engine 112 is a component for learning not only basic agent skills, such as media type availability (i.e. multimedia for multiple medias of connectivity) or skills such as bilingual capabilities, and knowledge of a product or service, but also for discovering skills related to software application knowledge, proficiency in certain communications skills, multitasking capabilities using more than one media combination, and skills that may be acquired through external connections or sources maintained by a particular access point.

SP component within engine 112 in cooperation with interaction server 109 and routing software calculates real-time skill levels of all available agents/systems also referred to as access points that could be a destination for any particular event in queue 1113. In interaction routing based on skills the field is narrowed to one or two agents that posses the best skill rating for handling the specific event waiting, after skills comparison and scoring, which may also include specific skills weighting. The system is self-learning in that as skill levels of agents increase in particular areas, or skills become obsolete due to applications switching (from old to new), the component avails itself of the latest data available in facility 114, perhaps in MD storage or in a skills database adapted for the purpose of storing all skills data.

Access points 129 initially report or post certain basic skill levels, and other skills are evaluated during periodic reviews or are posted or published to the system. As an access point acquires higher skill levels and as new skills are acquired, the data is recorded and reused in skill-based routing. Additional non-traditional skills are periodically discovered that are not traditional in the sense of skill-based routing according to intrinsic skills but are instead derived from agent contacts and connections to resources that can be external from the communications center or enterprise domain such as access to special knowledge bases, or access to additional service professionals known to the agent but not necessarily part of the communication center or enterprise-wide infrastructure. One simple example of discovery of non-traditional skills might be that if an agent, also termed a customer service representative (CSR) is particularly efficient using a new type of public search engine. Discovery of the existence of and agent utilization of the engine may cause the particular agent to receive "points" over another agent that does not exhibit access to the engine or has according to statistical analysis of interaction data, mediocre skills with the same search engine as compared to the first agent. The more experienced agent in data searching using the new engine can provide potentially better search results faster than the agent not utilizing the engine or rated as "less than effective" with the engine thus denoting a higher skill level for the original agent that discovered the engine in that particular vein.

In a preferred embodiment of the invention, skills discovery is multi-order and multidimensional. By multi-order it is meant that a skills discovery process first gathers skills data from persons and/or systems (access points) in the immediate domain of the enterprise or internally mapped skills. It may be thought of as skill data gathering on an order of 1 or first level. It then may continue in bigger ever circles, such as multiple campuses, multiple companies in the group etc. Multidimensional refers to a capability of repeating the gathering process over several distinct knowledge or business areas that may differ from one another according to enterprise make-up or area definition. For example, employee Jeff within an enterprise (first order) may not possess knowledge in a certain area, but knows he can get it from a specific external consultant Bob (second order). Bob does have some knowledge in the area, but he in turn consults with his senior consultant partner Mary (third order) when he requires more information on the subject. Multidimensional, as described above, refers to a capability of repeating the gathering process independently in distinct subject areas.

The system then gathers data about interactions that access points participate in with other people, systems, and resources when the access points are seeking additional information or knowledge in a specific area or are obtaining knowledge from outside the enterprise domain. Generally speaking, these interactions take place when traditional skill sets are not enough to resolve an issue or to complete a business transaction or process in a level desired by a customer or agent helping the customer.

Human agents can reveal their own resource contact information by periodic posting of the information to the enterprise system or by participating in periodic proactive survey campaigns, by phone (outbound call center), e-mail, chat, WEB etc. Systems that have machine-to-machine consulting capability can be thought of as non-human access points wherein the "externally hosted" knowledge available to them through requests made to network-accessible resources like data stores does not have to be only locally available within the enterprise domain. That is to say that the enterprise does not have to house the data and may not be responsible for maintaining the data. In these cases, such network mappable resources are thought of as discovered skills even though they may be highly reliable and tied into the enterprise grid through network address and automated access services.

Interactions carried on by agents and systems that reveal additional skills have media types, contact or connection attributes, and resource access protocols. These properties will vary depending on the type of interaction used to access the resource and the methods and devices for used in the interaction. For example, an interaction can be unidirectional, inbound or outbound, or bi-directional.

In a most typical application an access point is a human CSR or KW that uses enterprise internal and external resources when solving problems, helping clients, closing transactions, or for performing other tasks. While traditional skills (media type, product, service, language, knowledge data) may be well documented for agents and for enterprise-hosted systems, new resources discovered can augment the skills set of a CSR, KW, or automated system. The new resources reported to or discovered by the system can also, in some embodiments, be migrated into the enterprise domain as a newly defined traditional skill set if economics warrant it. In a preferred embodiment, the enterprise does not store resource data or other hard data about externally discovered resources into a data store analogous to data stores in facility 114. Also, in some cases, it may include resources of customers or vendors, who co-operate.

Resource access protocols and contact parameters must be known to enable the interactions used by the access points to access the resources. The system uses this information to construct a network mapping of the resource locations and connection paths to the resources. The connection paths include identification of the access points that are privy to the resources and preferred media types for accessing the resources. However, if the enterprise decides to incorporate a resource as a traditional skill or set of skills, then connection paths to any particular resource could be extended to include more access point participation from more than one access point of the enterprise.

Figure 10:
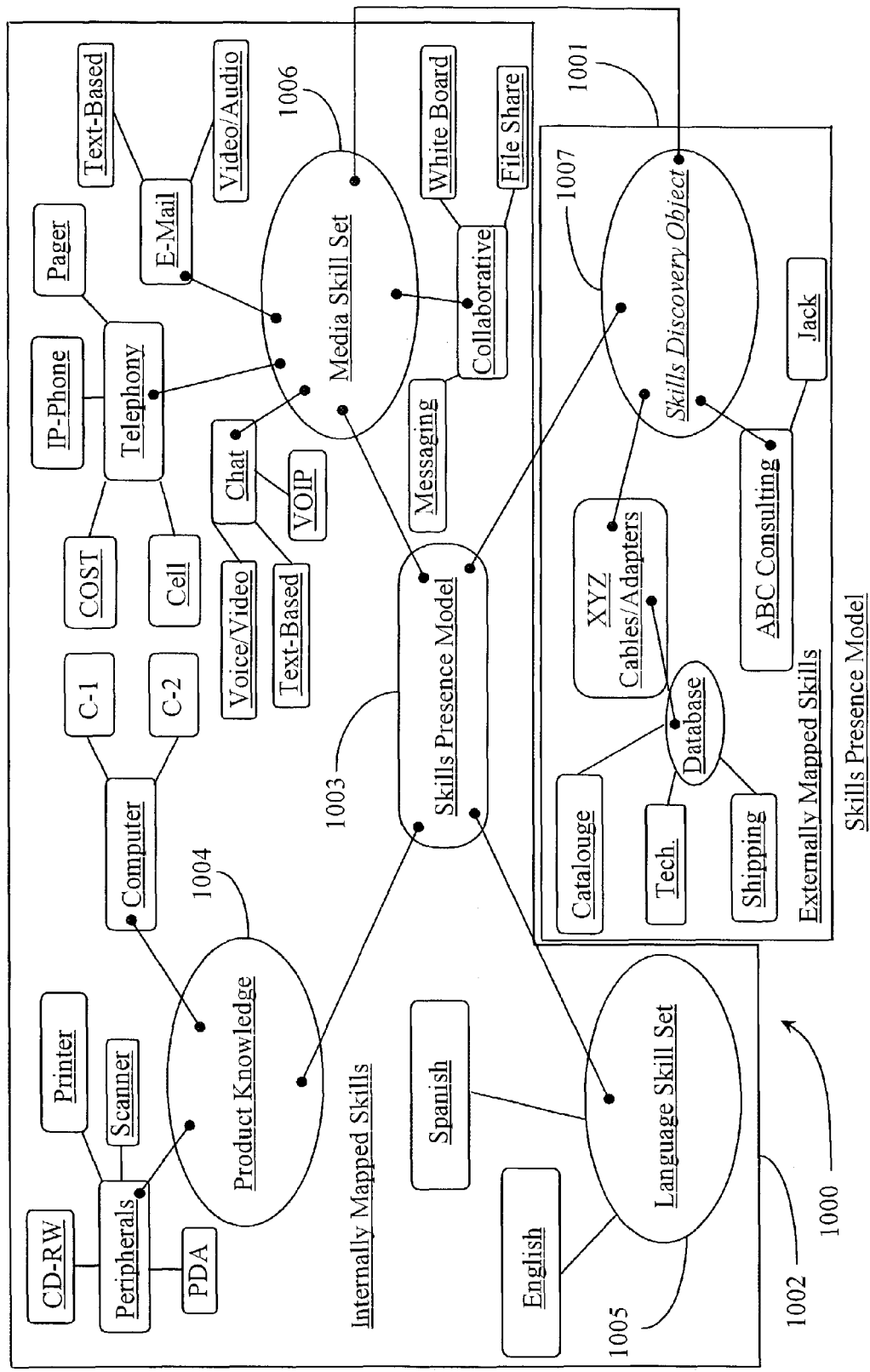
FIG. 10 is a block diagram illustrating a skills presence model according to an embodiment of the present invention.

FIG. 10 is a block diagram illustrating a skills presence model 1003 according to an embodiment of the present invention. A skills environment 1000 is illustrated in this example and is intended to represent an exemplary sampling of all available skills that may be serviced by one or a combination of access points in an interaction. Skills environment 1000 includes skills that fall under enterprise domain or internally mapped skills 1002 and skills that source from beyond the enterprise domain or externally mapped skills 1001. A skills-presence model 1003 is illustrated in this example and encompasses traditional skill objects illustrated herein as a product knowledge skill object 1004, a media skill set object 1006, and a language skill set 1005. Skill objects 1004, 1005, and 1006 fall into the class of enterprise directed skills that are known to and supported by the enterprise.

Language skill set model 1005 has the object properties of English and of Spanish in this example. An access point that has language skill set 1005 can process orders and can communicate fluently in both Spanish and English. It will be appreciated that not all access points will be bilingual let alone communicate in a same language as another access point. Therefore, it is logical to assume that different access points will have their own unique skills capabilities. Likewise in the event of a combined skills presence model (skills associated with more than one access point) One access point may possess one language skill whereas the other access point used in combination may possess another language skill, but both languages are required to perform a specific function of a skills requirement or expression associated with a pending interaction.

Product knowledge object 1004 has associated objects Computer and Peripherals that designate the broad definitions of offered products of the enterprise in this example. Object Computer has attributes C-1 (computer model 1) and C-2 (computer model 2) indicating that there are two separate computers offered as computer products. It will be appreciated that attributes C-1 and C-2 will have properties (not illustrated) associated with them that describe and complete the objects. Such properties may include but are certainly not limited to pricing, color, monitor type, hard drive type, port features, and so on that define all of the options available to customers.

Object Computer also has a peripheral class object that encompasses, in this case offered peripheral products. The peripheral objects associated with Peripheral are a compact disc-read/write drive (CD-RW), a printer, a scanner, and a personal digital assistant (PDA). As mentioned above with reference to objects C-1 and C-2, there are properties associated with each type of peripheral object that complete the definitions and descriptions of each offered product. It will be appreciated that attributes or properties of objects defined collectively as product knowledge may also have data base access properties or skills for accessing pricing information, and for performing other necessary database accesses for related data before, during, and following interactions with clients.

Media skill-set object 1006 has a variety of media skill objects associated thereto. These objects are illustrated in this example as Telephony, E-mail, Chat, and Collaborative applications. Telephony class object has associated telephony objects IP-phone, COST phone, Cell phone, and Pager. This means that this particular access point can process telephony using all of the mentioned devices. Each mentioned object will have attributes or properties that include but are not limited to contact parameters like telephone numbers, machine addresses, extensions, and so on. E-mail class object has an associated text-based object and a Video/Audio object. Therefore, the access point has media capability of processing text-based e-mails and audio/video-based e-mails. There may be separate addresses for each capability as well as separate programs for enabling the capabilities.

Chat object has sub-objects Voice over Internet Protocol (VoIP), Text-based, and Voice with Video. These objects describe the broad chat capabilities. All of the mentioned capabilities may be available from within a single program or the may be available through more than one chat program. Contact parameters and other enabling and pertinent data are modeled as properties and are assumed to be part of all of the media skill items that are available to an access point. Collaborative media class includes the objects Messaging, White board, and File share, defining the separate capabilities under Collaborative. Machine addressing, contact parameters, and other modeled properties also are assumed present and applicable to the media items illustrated under Collaborative but are not logically illustrated in this example.

An access point possessing skills presence model 1003 can be thought of as capable in all of the areas and skills identified by the model. Presence model 1003 will not always look the same because the model is dynamically changeable according to current monitored and/or predicted states attributed to the particular access point. For example, the Telephony skill set may be determined to be busy if the access point is currently occupied in a telephone conference using a COST phone. However, his pager may be reported as not busy because he or she can still receive paging messages while telephone conferencing. Similarly, text-based e-mail and messaging may also be considered active for routing purposes. Likewise, certain skills including media skills may be pre-set to be active and can only be considered for availability during certain periods of time. Furthermore, a reciprocal rule may play a part that will set a certain media as busy if another media is active even though the specified media is not technically busy. For example a rule may exist that says no two synchronous channels can be in opposite states of readiness, implying that a resource whose "COST phone" skill is in use, may have their "IM" channel marked as busy to satisfy the above rule. The media skills can be independent OR have relationships.

An interaction between a client and an access point may include more than one media type running in parallel and may also include more than one access point processing the interaction. Skills presence model 1003 lists all of the skills attributed to the access point or to a combination of two or more access points. In real time, states are associated with views of model 1003 the states applying to each media channel or access resource. The overall state of an access point is determined by computing the current states of use of all of the possessed skills. In this way an access point can still be utilized for some interaction even if there are some channels currently "in use" but some channels still open.

Skills presence model 1003 has a skills discovery object 1007 that defines the non-enterprise directed or controlled skills that may be available to an access point. In this example, skills discovery object 1007 falls into the class and domain of externally mapped skills 1001. That is not to say however that skills discovery object 1007 cannot include any internally mapped resources. In this example, object 1007 is associated with an access capability to a company illustrated herein as XYZ Cables/Adaptors. The access point utilizes the connection with XYZ to access additional data from a database illustrated in this example as an object labeled Database. Properties of Database include Catalogue, Technical (Tech.) and Shipping. An access point having the described contact capabilities with XYZ can access the third-party database to obtain information that may help a client to make a decision.

Skills discovery object 1007 also has access capability to a company ABC consulting represented herein as an associated object labeled ABC Consulting. ABC Consulting has an attribute Alpha, which is a human resource of information that the access point uses from time to time in helping enterprise customers. The actual data representing these externally mapped skills as defined by the enterprise includes a summary description of each resource and the correct connection paths and any optional paths including media types used to communicate over the identified paths. The enterprise does not directly maintain any hard persistent data that may be provided by the resources. However, for routing purposes, the access point having the discoverable skills may be selected for routing of interactions that may demand or at least desire any of the types of skills represented by the skills discovery object.

The complete skills presence model then also encompasses skills discovery object 1007. It is noted herein that each access point is uniquely identified and has a personal skills presence object that is dynamically generated and modified during activity and updated over time according to new disclosures or discoveries of additional skills. The skills discovery network is a constructed logical map with dimensional overlays showing a skills presence map and lines of interaction in the enterprise, together with the most important external sources of information for each access point.

Any criteria of compartmentalization may be practiced in generating a skills model template. For example, an access point located in a financial department will typically exhibit a wholly different set of skills than an access point located in a production department or a purchasing department would. Skills presence models of human and system access points in differing departments can be searched and evaluated and dynamically linked by enterprise managers to provide a virtual ad-hoc network of personnel and/or dedicated systems that may be assigned or dedicated to a special project, the assignment due in part to skills discovery. Likewise, a skills presence model of one access point may be overlaid on a model belonging to another access point to produce a combined skills presence model.

Skills migration from enterprise-external to enterprise-directed domains can in some embodiments of the present invention, be undertaken if a skills mapping used in interactions proves extraordinarily successful for enterprise customers. For example, the resource "Alpha at ABC consulting may only be an available resource through a single human access point of the enterprise. Since all enterprise interactions are recorded and are recoverable, analysis of historical interaction chains may show that clients who conducted business with the access point wherein the resource Alpha was consulted during those interactions were substantially more satisfied than other enterprise clients helped by access points that do not have Alpha as an available resource. It may be that the resource Alpha was not reported as an externally based resource available to the access point but analysis of historical records of interactions "discovered" the interactions between the access point and Alpha.

It may be desired by enterprise personnel to in some fashion "migrate" the resource Alpha into the enterprise domain so that more enterprise clients might benefit from knowledge or services available through Alpha. Recruitment or creative contractual arrangement can be pursued by the enterprise to incorporate Alpha into more of the enterprise business. If Alpha can be persuaded to oblige then the skills mapping (connection path and preferred media types for interacting with Alpha) can be distributed to all access points that perform the same or similar services as the original access point that reported the resource Alpha, or through which, the resource Alpha was discovered. The mappings are then incorporated into the skills presence models of any access points that will now have access to Alpha. In this way knowledge available outside of the enterprise domain can be leveraged to better serve enterprise customers. The same migration concept can be applied to externally held databases, knowledge bases and Web-services provided by third parties.

Externally mapped skills are essentially defined by connection path, media type or types required for connection, and a short summary description of the nature of the mapped resource. A dynamic network of logical mappings is created that can be used in routing interactions and in locating individuals that posses certain desirable skills. The dynamic characteristics include continual addition of new mappings and deletion or modification of old mappings as required. For example, if an externally mapped resource changes location, then that resource would be re-mapped. The ability to consider enterprise-external skills along with enterprise-intrinsic skills in terms of skills analysis and evaluation of access points provides a leverage tool for optimizing enterprise growth and direction.

Human agents that tend to keep their resources "secret" in a highly competitive sales or consulting environment, for example, would instead be encouraged to report the existence of their developed sources in order to improve service for clients across the board. In some embodiments, agents that continually strive to develop additional skills that can be mapped and that are of use in their endeavors would be rewarded by receiving preference status as preferred CSRs in the routing of interactions. For example, a CSR with exceptional resources would get to service the more valuable and stable clients of the enterprise.

Figure 11:
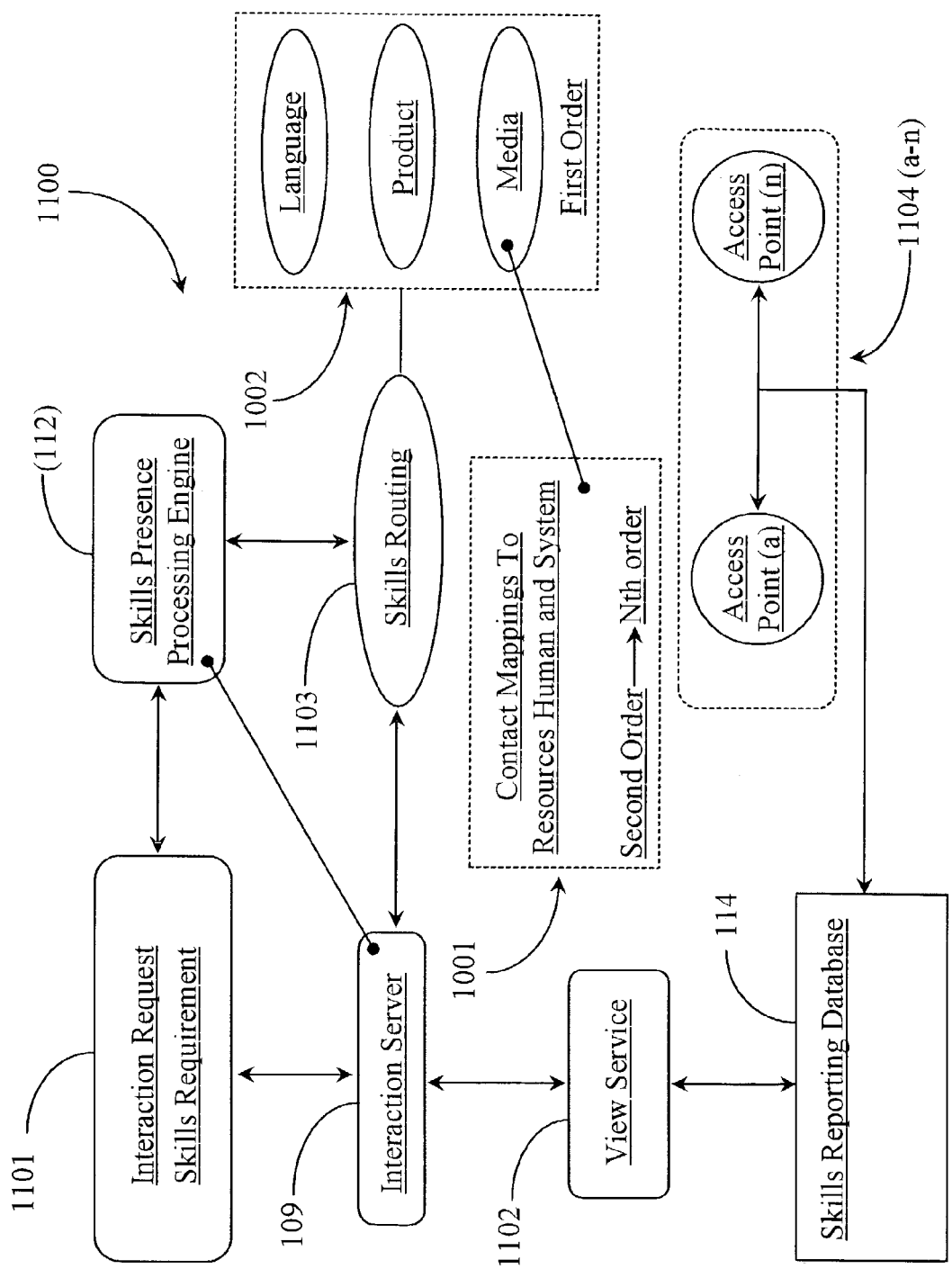
FIG. 11 is a block diagram illustrating skills discovery and routing interaction according to an embodiment of the present invention.

FIG. 11 is a block diagram illustrating a routing model 1100 based on skills including discovered skills according to an embodiment of the present invention. Model 1100 illustrates the components and interaction capabilities used in routing based on skills. An interaction request 1101 is illustrated in this example as any typical request received from a client and queued for routing to one or more access points. It is noted herein that routing in this embodiment can be performed on a push or pull basis. That is to say that an access point may subscribe to certain interactions wherein the access point is logically routed to the interaction request or the interaction request may be logically routed to the access point. In either case, skills presence plays an important role. It is also noted herein that more than one access point may service a request in parallel or in series through transfer after initial routing or through direct parallel routing of an interaction to more than one access point that will service the interaction.

In one embodiment when interaction request 1101 is queued for processing, interaction server 109 and processing engine 112 (introduced with reference to FIG. 1) work in conjunction to determine what the skills requirements (expression) of the request are and what preferred media type or types will be used in constructing the pending interaction. In one embodiment the request already has a primary media type, for example, a COST call. However, it may be determined that other skills including additional media types are also required to service the request. It is noted that the required skill set to service the interaction may involve routing and connection to more than one access point.

In one embodiment, interaction server 109 utilizes a view service interface illustrated logically herein as view service 1102 that is provided as a part of a software service application termed "view services" by the inventor. View services enable any requesting system component or human operator to call up object-oriented views of dynamically changing modeled states of enterprise objects, as they may exist at any point in time within the enterprise. View service 1102 may be based in interaction server 109 or in object framework associated through middleware to a skills-reporting database held within backend facility 14 (introduced with reference to FIG. 1). In this case view service 1102 is serving skills presence model views attributed to access points considered in skills routing. The just mentioned access points are illustrated herein as access points 1104(*a-n*). In this example, all of the available intrinsic skills and mapped skills of access points 1104*a-n* are periodically reported to database 114 and are accessible through view service 1102.

In another embodiment, view services of which view service 1102 is a part, is based within skills presence processing engine 112 and might only use front-end objects to compile the dynamic views. In this case, hard data is not directly accessed but only monitored state information related to skills possessed by each of the access points 1104 and the current availability states of those skills are accessed using objects stored in an object oriented database or object library to construct the views. As state changes in terms of skills availability such as media availability then the dynamic views change accordingly.

In this example the complete skills data models for each access point are mapped to and reported by a skills reporting database 114. View service 1102 provides object-oriented views of those state models to interaction server 109. Server 109 can share the views with presence engine 112. Skills presence engine 112 processes the skills requirement or expression of request 1101 against the available skills possessed by the access point group 1104*a-n* using a an algorithmic skills routing routine illustrated herein as skills routing 1103. Skills routing 1103 can use a variety of methods to calculate skill values including spawning of different routines for handling different skills types.

Interaction server 109 constructs the interaction scheme including connections that will be used for the pending interaction. Results of processing are used to physically set up the connection or connections between the initiator of request 1101 and the selected access point or points 1104*a-n*.

An access point or points are selected that will best serve request 1001 based on the available skills determined to be necessary or at least desirable for resolving the interaction request including, in some cases, consideration of external skills mapped by skills discovery methods. For example, assume now that internally mapped skills 1002 (introduced in FIG. 10) define the available skills of one of access points 1104a-n selected as a primary target by skills routing routine 1103. The available skills represent those of a first order, or skills that are enterprise intrinsic including language skills, product skills, and media skills. The view also has externally mapped skills 1001 (introduced with reference to FIG. 10) of the access point that contain the contact mappings to human and system resources on a first order through nth order discovery paths.

The order designation indicates the levels of interaction required to discover a particular external resource. In one embodiment the routing view is a combination of available skills owned by more than one access point. In this case, interaction server 109 may construct an interaction scheme of a primary media type, perhaps COST call to one of the selected access points and a file delivery to the client as an outbound interaction to be initiated from the other access point. In this case the primary access point conducts the COST interaction but may be busy sending a large file to another unrelated client. Therefore the second access point who is not busy sending files is selected to meet that particular skill requirement of the interaction request.

First order implies enterprise intrinsic wherein no external connection is required for accessing a resource. First order implies that the resource is accessible through a single interaction initiated through an access point. In some cases, a resource may only be discoverable through a series of interactions, for example, through a first order interaction, followed by n number of interactions before a resource is accessed. A network navigation sequence of more than one universal resource locator (URL) is an example of an nth order interaction to discover a skill. That is to say that the resource is discovered by traversing n number of URLs before the information sought can be obtained. Another example would be navigating through more than one private network to access a resource wherein security routines are practiced at each entry point or network gateway. There are many possibilities. However, once a skill is discovered contact paths to the new skill can be resolved to a single interaction.

The method and apparatus of the present invention can be used in routing interactions and in discovering skills and ergo appropriate personnel for assigning projects to whether those projects or assignments are routine or specially created. Moreover, skills identified that are not directly controllable by the enterprise can, in some embodiments, be incorporated or migrated into the enterprise domain in whole or in part.

Figure 12:
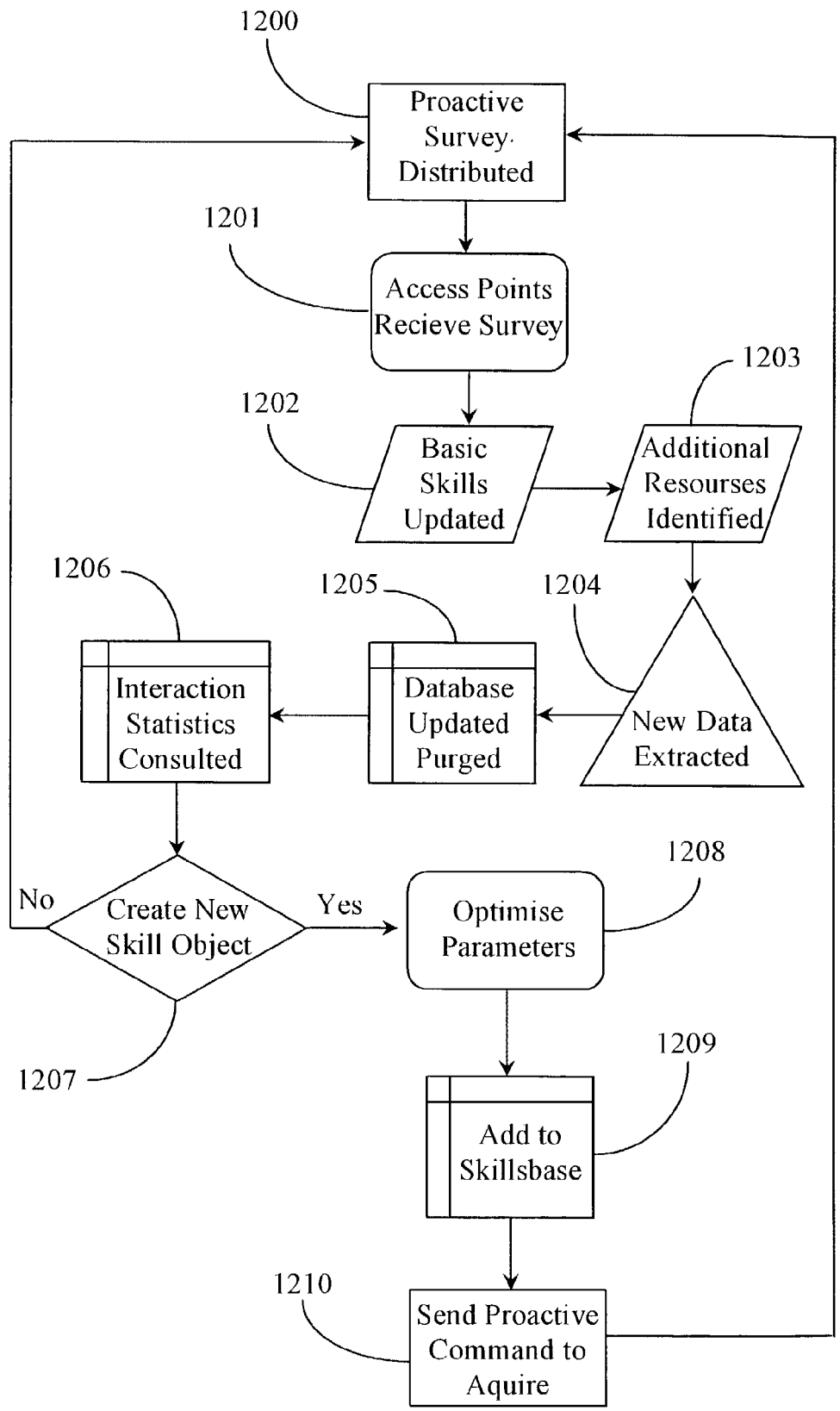
FIG. 12 is a process flow diagram illustrating a process for discovering new skills and skills migration according to an embodiment of the present invention.

FIG. 12 is a process flow diagram illustrating a process for discovering new skills and skills migration according to an embodiment of the present invention. At step 1200 a proactive survey is distributed to specific access points. The survey may be an interactive form distributed through e-mail according to a time-based schema or an internal proactive campaign launched to a targeted group of access points. The survey may be presented in a variety of mixed media types. The exact distribution scheme and specified recipients of the survey will depend on the skills area covered by the survey and any enterprise compartmentalization rules. For example, a survey may be designed to cover skills of access points associated with a finance department. The survey may ask for any newly acquired intrinsic skills and may ask for a self-rating of improvements in existing intrinsic skills. Skills include media skills, product knowledge skills, database skills, language skills, application skills, and so on.

In a preferred embodiment, the survey will ask for any information related to any external resources (not intrinsic to the enterprise) that are known to and used by the access points in provision of, in this case, financial services to clients of the enterprise. The information asked for consists primarily of the connection paths used to access the external sources, a summary description of the resources, and the preferred media types used to access the resources. The resources defined can be human served, system served, or media-based resources wherein the media can include access to periodicals, publications, and other mediums. It is noted herein that a discovery path, which may be of first order to n order type may be a logical path instead of a physical connection path. For example, if an access point has to first leave a building, enter another building, and use a specific computer at the other building before the resource can be discovered, then the functions of navigating to the node access point would be logical connection path representation. It is important to produce the "location" of the resource, which is not entirely discovered if it cannot be replicated through description. Once discovered, physical connection parameters can be resolved to a minimum of interactions. In some cases where a nth order skill is discovered but cannot be migrated into the enterprise first level, then the number of interactions required to reach the resource may remain the same as for discovering the resource.

In one embodiment, if the access point cannot immediately provide the exact connection path and contact parameters of an external resource, the information can be discovered by the enterprise using analysis of recent historical interaction threads of the access point where the resource was tapped. This embodiment assumes that the contact parameters, media types, and connection path data are available properties associated with the interactive icons of the interaction thread views. An access point may provide part of the information to be used as search criteria for discovering the historical information revealing the source attributes. If the access points already have externally mapped skills associated with their presence models, they may also be asked to provide any modifications of the connection paths, or other attributes if any of those attributes have changed.

At step 1201 the access points confirm receipt of their surveys. At step 1202, the access points update their basic skills assessments in terms of intrinsic skills and at step 1203 identify and provide contact information, media information and connection path information related to additional resources reported.

At step 1204, the system receives the survey data from the participating access points and extracts any new data for update into the skills database. The system may use a centrally located server for receiving and parsing the data. At step 1205 the system updates the database with new data and purges the database of any obsolete data. It is noted herein that part of the database update process may include data validation techniques in order to make sure that all of the resource data is correct for each access point participating. All of the new data is represented in model form for each of the access points individually updated and viewable in their most recent skills presence models. Externally mapped skills, which may also include some internally mapped skills are incorporated in terms of dimensional mapping into a skills discovery mapping.

Steps 1200 through 1205 describe a process for keeping skills data updated for each access point through automated proactive survey techniques and updating a skills network mapping for all of the access points involved. For skills data held by automated systems, surveys can be distributed to system administrators to add any changes or modifications related to the automated systems skills capabilities including new media types available and data about any new resources internal or external that are configured to be available through the systems.

In another embodiment of the invention instead of proactive surveys being sent to access points, the access points are required to post or publish new and updated skills periodically such as in a monthly system report. In this embodiment supervisory review data may also be included.

At step 1206, a system administrator, an administration team, or other authorized personnel consults interaction statistics compiled through data analysis of interactions that have occurred with reference to specific access points where the interactions included access to externally mapped resources. The consultation process is undertaken to determine whether certain externally mapped skills should be incorporated into the enterprise as intrinsic skills. For example, statistics may reveal that clients fared better when their interactions with the enterprise included specific externally mapped resources through the associated access points. In one example, it may be that certain interactions that occurred through an access point where a specific externally mapped resource was involved were resolved with fewer steps than other interactions where the resource was not involved.

At step 1207, the administrators determine if any new skill objects should be created due to results of interaction analysis. It is noted herein that step 1207 is an ongoing process and may be repeated many times depending on result analysis. It is also noted that there may be more steps required before a new skills object can be generated. The steps required are determined by the nature of the resource and may include recruitment, contracting, or other processes before the resource can be incorporated intrinsically. In the event that no externally mapped resources will be incorporated for wider enterprise access at step 1207, the process resolves back to step 1200 and a next proactive survey is generated and distributed.

If at step 1207, it is decided that one or more new skill objects will be generated then at step 1208 the objects parameters are optimized and validated. Optimization will include defining the resource, quantifying media types that can be used to access the resource, and the desired number of access points that will make the resource available in the context of their CSR duties. In one embodiment, the resource parameters like location, connection paths, and media type available for accessing the resource may have to be validated before a successful skill object can be created.

At step 1209 the new object or objects are added to the skills database or skills base appropriately for all of the access points through which the new skill will now be available to clients. More particularly, the resource contact and connection parameters as well as the nth order mappings of the object are entered into the skills presence data for all of the selected access points that will have access to the skill. Likewise, their skill presence models will be updated to reflect the addition of a new skills object.

At step 1210 a proactive command is sent to all affected access points to acquire the new skill. This step may include instructions for accepting the parameters of the object into their affected communications address books and programs, and a summary defining the resource and how to use the resource to benefit enterprise clients. In one embodiment, the object parameters are automatically incorporated into local address books, applications, and so on the next time the affected access points log-in to the enterprise grid. In this embodiment a pop-up window informs them of the newly configured skill and how to access and use the skill. Also in this embodiment automated shortcuts and other automated navigation icons may be generated and placed in appropriate locations on desktops, in file folders, or any other required location in the computing environment of an affected access point.

At this point the data and/or services provided by the resource are still maintained by the resource, however now there is a wider enterprise access to the resource and the resource is represented as an enterprise intrinsic skill. Step 1210 resolves back to step 1200. It is noted herein that in one embodiment, steps 1200 through 1205 describe a process that is separable and independently operable from a process described by steps 1206 through 1210.

In an alternative embodiment, it is possible that the enterprise, through systematic analysis of cross-referenceable interaction threads can discover any new resources that an access point uses in the course of helping enterprise customers. For example, in interactive views of interaction threads, an unidentified resource may be associated with a generic icon on a particular interaction thread. The generic icon will appear in the interaction and in previous and subsequent threads each time the resource was accessed. The generic nature of the icon identifies the resource as a non-enterprise directed resource. The system records the connection device, paths, contact parameters and media type used to access the resource each time the resource was accessed. The actual text and media interaction between the access point and the resource are also recorded in the text and multi-media databases described with reference to FIG. 1 in facility 114. With all of this information about the resource available to the enterprise, enterprise personnel can discover and evaluate the resource without participation from the access point utilizing the resource.

Part of the interaction thread also reveals results of the interaction. For example, an interaction chain involving the purchase and follow up interactions associated with a transaction will include any follow up customer satisfaction surveys or other types of interactions where the customer is asked to supply rating information to help improve service. If the interactions that included the generic icon representing the accessed resource also were associated with better customer service ratings solicited from the customers as part of a follow up campaign then logically it may be desired to migrate the resource into the enterprise domain to make it at least accessible through a larger number of access points. At this point, the system can extend the availability of the resource as described above, and can create a unique enterprise icon for the resource to appear in subsequent interaction views. The new icon will denote a recognizable enterprise intrinsic skill.

A decision to incorporate or to abandon a mapped skill can be made by the enterprise by looking into statistics of access-point statistics related to processing of interactions in which the skill was used. Statistics can reveal average time working on interactions utilizing the skill; Total time working on interactions utilizing the skill; Total time a skill assumes a Not Ready state during a workflow period; and Total number of interactions processed over a period of time using the skill. Even though statistical analysis might show that a certain externally hosted skill helps customers to be more satisfied during the interactions, it may be the number of total interactions that can be processed by the access point using the skill is less than half of the number that can be processed by the same access point without the skill. In this case the enterprise may decide to eliminate the skill altogether or find some way of providing the skill without reducing the number of interactions possible of a specified period of time.

In the case that a particular interaction chain of an access point has more than one different resource that the enterprise does not direct, then the generic icons can be differentiated from one another by some order of occurrence when they were first created, for example, for a new resource. In this way enterprise operators searching the thread can distinguish from the icons of different resources.

Figure 13:
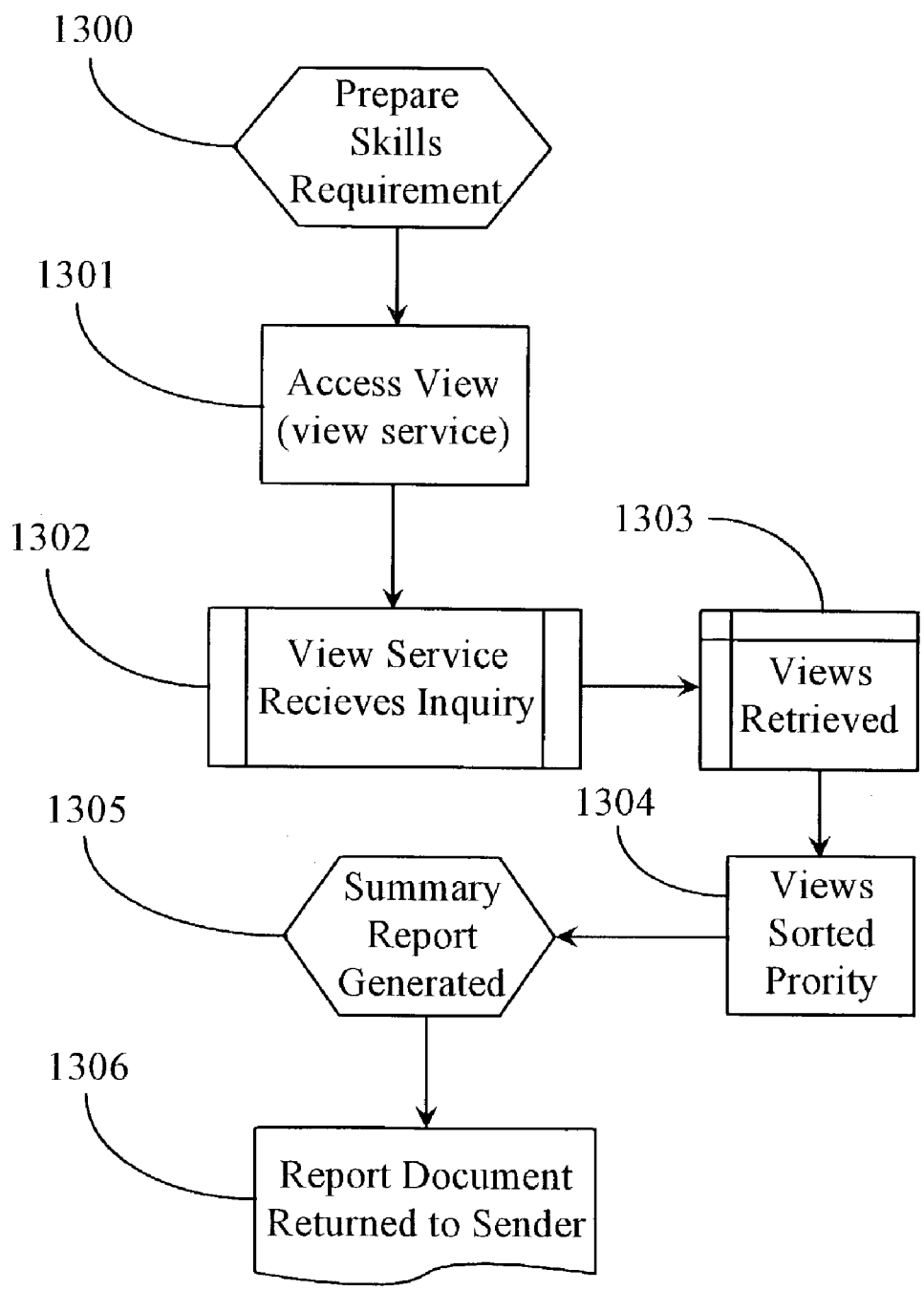
FIG. 13 is a process flow diagram illustrating a process for automated skills discovery according to another embodiment of the present invention.

FIG. 13 is a process flow diagram illustrating a process for automated skills discovery according to another embodiment of the present invention. At step 1300 a skills requirement is prepared for an assignment or for a special enterprise project. This step involves identifying all of the required and desired skills for filling a skills requirement for any type of task or project that might be undertaken by the enterprise.

At step 1301 a view service analogous to view service 1102 described with reference to FIG. 11 above is accessed and the skills requirement of step 1300 is submitted as an input inquiry or query to find access points possessing the skills. The inquiry or query can take the form of various media types. For example, the query might be a structured language query (SQL), an instant message, an e-mail, or, perhaps a Web form. At step 1302 the view service receives the inquiry of step 1301 and begins processing the request.

At step 1303, skills presence views are retrieved by the view service and at step 1304 they are sorted and prioritized with the views having the best matching skills to the inquiry listed first. At step 1305 a summary report is generated that identifies by name and contact information the top individuals that posses the required skills for the project including listing of any specialized skills that may be especially beneficial to the project. The summary report includes individual links to each included skills presence view for detailed review purposes. At step 1306, an electronic document or display window is returned to the sender of the inquiry. The document contains or window display contains the summary information generated in step 1305, and access through HTML or other embedded interactive linking to any particular skills presence view or grouping of views that a manager or other authorized personnel may wish to view further details about.

Once the inquiring personnel has decided based on system-returned views which of the enterprise personnel will be solicited for the project or task, they can initiate an automated proactive contact to all affected individuals informing them of the opportunity or recruitment into the project and an ad-hoc conference can be set up through an enterprise action room to begin the task or project work.

One distinct advantage of this object-oriented skills discovery technique is that it can be performed in a matter of minutes from any computerized system with a display that has access to the enterprise grid. For example, skills discovery and assessment for virtually any type of project can be performed on the fly from a meeting room, remote location, or from a mobile unit. This enables enterprise executives to quickly demonstrate to clients, potential clients, business partners, investors, or other audiences how quickly and professionally business processes and projects can be launched using any combination of desired skills that are well defined and graded for competence. Without the skills discovery method of the present invention it could take days, weeks, or even months for enterprise personnel to put together a team for accomplishing a specific project.

In one embodiment of the present invention, the skills discovery process or a version of it can be used in workflow management. Referring now back to FIG. 1, the work flow (WF) component of processing engine 112 may consult with a skills discovery mapping before finalizing work assignments to human and in some cases system access points. Workflow assignments might be fine tuned according to current skills presence data before being distributed. For example, a specific access point that has developed considerable and valuable outside skills might be assigned to processing interactions that are prioritized based on the average value of contribution from the client to the enterprise. In this scenario the more valuable interactions are routed to the access point having the more developed and valuable mapped skills. There are many possibilities.

Figure 14:
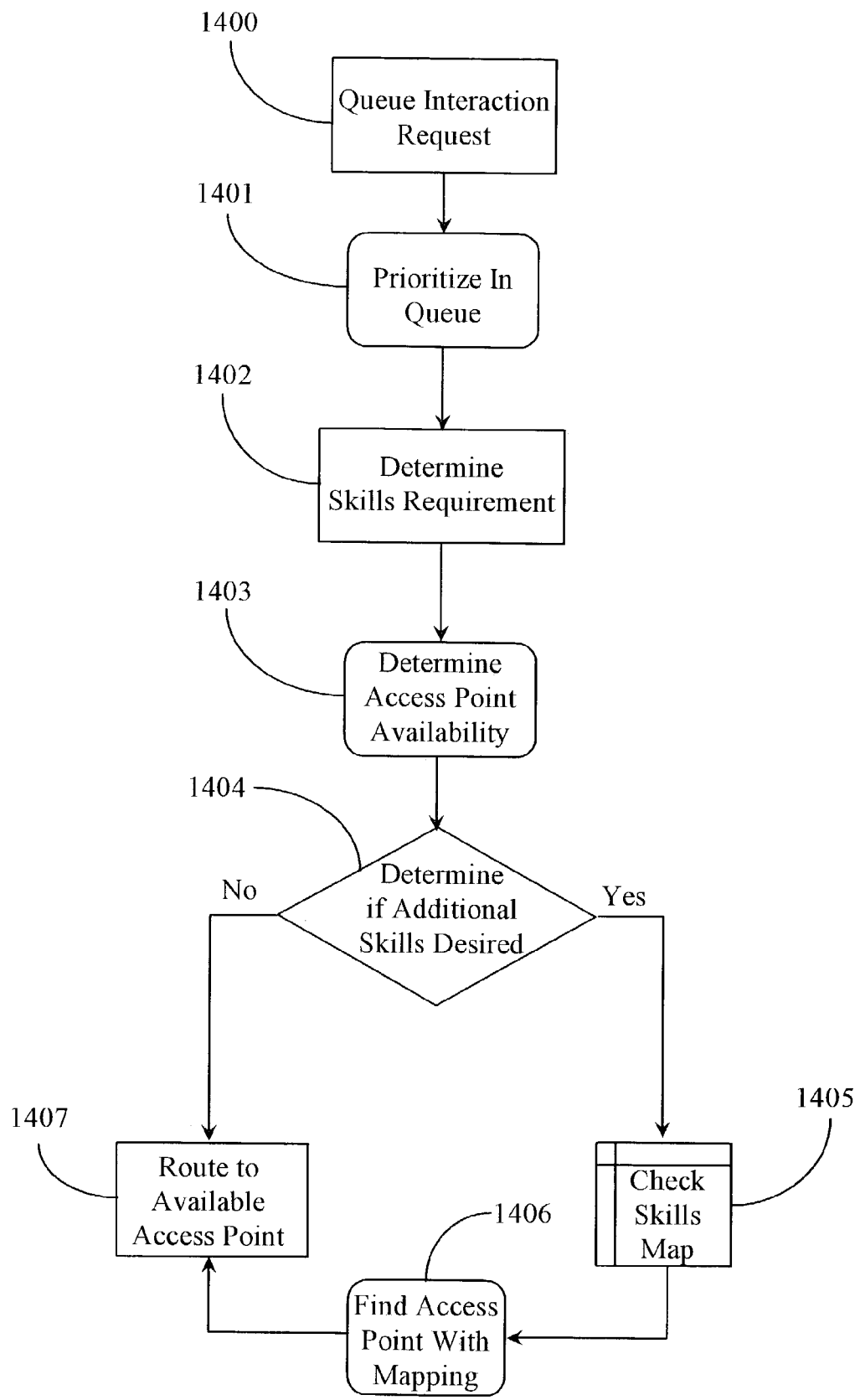
FIG. 14 is a process flow diagram illustrating a process for routing based on skill discovery according to an embodiment of the present invention.

FIG. 14 is a process flow diagram illustrating a process for routing based on skills discovery according to an embodiment of the present invention. At step 1400 an interaction request is received by the enterprise and is queued for routing based at least in part by skills matching. The interaction request can be associated with a primary media type with a skills expression attached, or it may be of an unassigned media type with a skills expression attached. The skills expression is an object that describes the desired skills of the interaction request. The skills expression is formed partly by nature and design of the request and additionally by any pre-interaction with the originator of the request for additional information about the request.

Optionally at step 1401 the interaction request is prioritized in queue. At step 1402 the skills requirement or expression is determined of the interaction request. This step may include parsing and other content discovery methods. At step 1403 the system determines access point skills availability based on the skills listed in the skills expression or skills requirement for routing. Skills associated with access points are, in one embodiment, reported and viewable through an object-oriented view service analogous to view service 1102 described with reference to FIG. 11. Availability of each skill presented is denoted by dynamic state information that can change according to use of the particular skill.

Availability pertains to the current state of any skills possessed by access points that could be used to satisfy the request. Busy, not busy, ready, not ready, active, inactive, and other status indicators may apply. Skills routing algorithms are utilized in processing the available skills of the considered access points. It is noted herein that for purposes of optimization, skills that do not relate to the skills expression of the interaction request are not considered or produced for view of skills presence models of the access points considered.

In step 1404, one or more access points are selected for interaction routing. In one embodiment a target access point is found that has all of the skills required and is the best match for the request according to skills available wherein the skill level of the access point is rated according to a score in comparison to the other considered access points by a skills presence calculator. In this embodiment a backup access point having a score that reflects a "next best match" may be selected as well and held in reserve in case of failure to connect with the primary access point.

In another embodiment, a skills presence model is generated that reflects a combination of skills currently available from more than one access point because a single access point could not be found that currently possesses all of the required skills listed in the skills expression of the request.

Optionally, at step 1404 the system performs a recheck and decides if there might be any additional skills that are desirable but not implicitly required for satisfying the request. In this step, the system can make a recommendation based on the skills expression for the purpose of optimizing routing according to additional rules based on a skills discovery map containing mappings to non-intrinsic skills. For example, if an interaction request intends to request technical information in addition to a possible purchase of a computer system on a payment plan, then the skills expression might be Computer C-1; Purchase; Financial; Telephone; Online; Technical Support; Spanish. Therefore the customer needs product skills related to computer C-1 including order taking skills and finance skills using the media skills telephone and online in the language skill of Spanish where it is desired to review some "technical information" before the transaction.

It may be that the current routing target or targets determined at step 1403 satisfies all of the skills determined to be part of the interaction request and no other skills are needed or desired from a customer or from an enterprise standpoint to help the customer or to optimize the customer's experience. If so then at step 1404 the system determines that no additional skills are desired for satisfying this interaction. At step 1407 the interaction is then routed to the available access point or points for interaction.

Alternatively, the system may determine in step 1404 that access to a specific technical paper or a particular database is desired to fulfill the customer desire for a technical review before agreeing to purchase the computer and that the current skills presence model of the target access point does not define this particular skill. A determination of yes in step 1404 triggers a check of the skills discovery network at step 1405 to look for a skills mapping to a technical resource containing the technical information related to computer C-1. It is noted herein that the mapping may be internal or external and is, in this case a skill not directly controlled by the enterprise.

A search of the skills discovery network reveals a best match mapping for the additional resource. At step 1406, the system finds the access point or list of access points having that particular mapping associated with their skills discovery objects of their skills presence models. In case of more than one access point revealing the mapping, an availability check is performed to isolate one that is not using the resource in another interaction. It may be the nature of the resource that if one access point is currently using the resource then it is determined to be unavailable at the time. These parameters will depend on the nature of the resource. It may also be the case that only one access point has access to the resource identified in the map.

At step 1407 the access point associated with the desired mapping is routed to the primary access point or points at the time of the interaction routing in order to make available to the primary access point only the additional skill determined by the system to be desired to aid in processing the interaction. In actual practice the interaction will ensue with the primary access point helping the customer, however, the primary access point is made aware of the secondary access point and the resource by an alert or pop-up window that is transparent to the customer. The primary access point can transfer the interaction to the secondary access point to conduct the technical review portion of the transaction. When the technical review portion is complete the interaction can be handed back to the primary access point.

In another embodiment, the primary access point can enlist the services of the secondary access point by assigning a new media channel for the interaction. The new media channel represents an unused media channel set up between the client and the access point through which the additional resource is available the added access point providing the technical review information over the new channel during the at some point during the interaction. The selected channel can be an online media (available to the client and listed in the skills expression of the request) like e-mail, chat invitation, or a file share set up by the interaction server between the customer and the access point associated with the mapping of the resource.

It is noted herein that steps 1404, 1405, and 1406 may be executed according to a system recommendation based on a rule that in place as a result of analysis of prior success of interactions based on introduction of the particular non-enterprise-directed resource through known access points. For example, if it has been determined that the customer will likely experience a higher level of fulfillment if the particular mapped resource in the skills discovery network is used then it may be mandatory that the access point through which the particular resource is accessible be included in the interaction processing even if the access point brings no other skills to bear on the interaction processing. For example, the primary access point can be engaged in setting up the payment plan and options for purchase of the computer with the client over the telephone while the secondary access point provides a download of the technical information on the product through the Internet.

It is also noted herein that the primary access point may elect not to use or make available the "system recommended" access point and resource if the customer has decided that the additional information was not necessary to have before making a purchase. Another use case where primary and secondary routing to access points might be useful is in the area of investments wherein a stockbroker represents an access point for handling a series of transactions initiated by a customer and wherein a secondary access point provides the latest research results or recommendations as a specialized service through access to a third party database that details the latest information. There are many areas of business where third party data might come into play before decisions are made and transactions completed.

In one embodiment, certain access points might be dedicated to providing information from third-party sources but do not handle the actual transaction parameters. The skills of such specialists might be represented in a skills map and presence model that is completely separate from the skills models of regular CSRs and their skills might only be brought into play when they are required. These specialists might compete by developing and refining their access capabilities to valuable third-party data resources that have immediate bearing on interactions that are processed by the enterprise on a continual basis. One primary advantage of this embodiment is that the enterprise does not have to physically store and maintain the third-party data. Therefore, much overhead related to data administration can be eliminated while a complete and comprehensive service is still maintained by the enterprise for its clients. There are many different use-case possibilities.

The method and apparatus of the present invention can be practiced on any combination of networks including the Internet and connected subnets without departing from the spirit and scope of the invention. Mapped skills data by nature of the data identifies a virtual network of skills that are in one way or another available to the enterprise. Knowledge of these skills provides a template to aid and streamline future planning of growth and direction within the enterprise. By analyzing records the enterprise can study effects on clients of newly discovered skills that are not intrinsic to the enterprise but available through specific access points of the enterprise. Data results of analysis can provide clear direction to enterprise personnel about whether certain discovered skills should be incorporated within the enterprise domain through migration, or should remain non-intrinsic to the enterprise but be made more widely available to access point, therefore ultimately to more enterprise clients.

The methods and apparatus of the invention should be afforded the broadest possible scope under examination. The spirit and scope of the present invention is limited only by the following claims.

What is claimed is:

1. A routing engine operating within a communication center, comprising:

a routing application stored on and executing from a memory medium of the routing engine;

a plurality of agents operating agent stations including a plurality of potential routing destinations at the agent stations coupled to the routing engine;

a data repository coupled to the routing engine, storing skills data previously determined for the plurality of agents and the potential routing destinations;

wherein the skills include at least types of media knowledge of agents and media capability at the potential routing destinations and the routing application, coupled to one or more of the potential routing destinations, upon receiving a transaction to route, determines one or more skills of agents and potential routing destinations required to interact with the transaction; and in the time between receiving the transaction to route and the time of routing the transaction, determines, through the coupling to the potential routing destinations and without recourse to the skills data stored in the data repository, whether one or more agents having the required skills are at that time available at the one or more of the potential routing destinations also having the required skills, and then routes the transaction to one or more of the potential routing destinations where the agent and the potential routing destination has the required skills available to interact with the transaction at the time of routing.

2. The routing engine of claim 1 wherein the media knowledge and media capability include at least Telephony, E-mail, Chat, and Collaborative applications.

3. The routing engine of claim 1 wherein the potential routing destinations include agent communication devices.

4. A transaction routing method, operating within a communication center, comprising the steps of:

(a) receiving a transaction to route;

(b) determining skills required of agents to interact with the transaction and skills capability at potential destinations, the agents operating agent stations including a plurality of the potential routing destinations, the skills including at least media knowledge of agents and media capability at the potential routing destinations;

(c) communicating with individual ones of the potential routing destinations, after receiving the transaction to route and before routing the transaction, discovering the skills available of agents at the individual ones of potential destinations and what skills are available at the potential routing destinations in that time interval; and (d) routing the transaction to an agent at one or more of the potential routing destinations having the available skills required to interact with the transaction for both the agent and the potential routing destination.

5. The transaction routing method of claim 4, wherein the media knowledge and media capability include at least Telephony, E-mail, Chat, and Collaborative applications.

6. The transaction routing method of claim 4, wherein the potential routing destinations include agent communication devices.

* * * * *